US012455817B2

(12) United States Patent
Nubile et al.

(10) Patent No.: US 12,455,817 B2
(45) Date of Patent: Oct. 28, 2025

(54) DUAL DATA CHANNEL PEAK POWER MANAGEMENT

(71) Applicant: Micron Technology, Inc., Boise, ID (US)

(72) Inventors: Luca Nubile, Sulmona (IT); Luigi Pilolli, L'Aquila (IT); Liang Yu, Boise, ID (US); Ali Mohammadzadeh, Mountain View, CA (US); Walter Di Francesco, Avezzano (IT); Biagio Iorio, L'Aquila (IT)

(73) Assignee: Micron Technology, Inc., Boise, ID (US)

( * ) Notice: Subject to any disclaimer, the term of this patent is extended or adjusted under 35 U.S.C. 154(b) by 69 days.

(21) Appl. No.: 18/494,841

(22) Filed: Oct. 26, 2023

(65) Prior Publication Data
US 2024/0143501 A1    May 2, 2024

Related U.S. Application Data

(60) Provisional application No. 63/419,811, filed on Oct. 27, 2022.

(51) Int. Cl.
G06F 12/02     (2006.01)
G06F 1/28      (2006.01)

(52) U.S. Cl.
CPC ............ *G06F 12/0246* (2013.01); *G06F 1/28* (2013.01)

(58) Field of Classification Search
CPC ...... G06F 12/00; G06F 12/02; G06F 12/0246; G06F 1/28; G06F 1/3275; G06F 12/0284; (Continued)

(56) References Cited

U.S. PATENT DOCUMENTS 6,587,905 B1 *   7/2003   Correale, Jr. ......... G06F 13/364
                                                      710/110
6,816,829 B1    11/2004   Clark et al.
(Continued)

FOREIGN PATENT DOCUMENTS

WO    WO-2019079378 A1 *   4/2019   ............ A61B 5/0002
WO    WO-2020223474 A1 *  11/2020   ............. G11C 16/26

OTHER PUBLICATIONS

A. Yakovlev, S. Furber, R. Krenz and A. Bystrov, "Design and analysis of a self-timed duplex communication system," in IEEE Transactions on Computers, vol. 53, No. 7, pp. 798-814, Jul. 2004.*

*Primary Examiner* — Pierre Michel Bataille
(74) *Attorney, Agent, or Firm* — Lowenstein Sandler LLP

(57) ABSTRACT

A memory device includes a plurality of memory dies. Each memory die of the plurality of memory dies includes a memory die and control logic, operatively coupled with the memory die, to perform operations including receiving, during a current auxiliary data communication cycle, a token to enable auxiliary data communication, in response to receiving the token, determining whether to communicate auxiliary data via an auxiliary data channel to at least one other memory die of a plurality of memory dies, and in response to determining to communicate the auxiliary data via the auxiliary data channel to the at least one other memory die, causing the auxiliary data to be communicated to the at least one other memory die.

20 Claims, 12 Drawing Sheets

(58) Field of Classification Search
CPC ......... G06F 2212/7208; G06F 12/0857; G06F 2212/1008; G06F 2212/1028; G06F 2212/1024; G06F 12/0842; G06F 3/0688; G06F 3/0604; G06F 3/0631; G06F 3/0653; G06F 3/0659; G06F 3/0679; G06F 3/0656; G11F 16/30; G11C 5/14
USPC ...................................... 711/103, 154; 713/1
See application file for complete search history.

(56) References Cited

U.S. PATENT DOCUMENTS

| | | | |
|---|---|---|---|
| 8,788,779 | B1 | 7/2014 | Horn |
| 8,850,134 | B1 | 9/2014 | Murdock |
| 9,401,184 | B1 * | 7/2016 | Erez ..................... G06F 1/3275 |
| 9,418,712 | B1 * | 8/2016 | Erez ..................... G06F 1/3221 |
| 9,455,027 | B1 * | 9/2016 | Mattos .................... G11C 5/14 |
| 10,068,624 | B2 * | 9/2018 | Kwon ................. G06F 13/1678 |
| 10,860,417 | B1 * | 12/2020 | Spirkl ................. G06F 11/1048 |
| 2007/0060145 | A1 | 3/2007 | Song et al. |
| 2008/0073975 | A1 | 3/2008 | Wight et al. |
| 2016/0291658 | A1 | 10/2016 | Kim et al. |
| 2016/0372160 | A1 | 12/2016 | Lehmann et al. |
| 2019/0034111 | A1 * | 1/2019 | Catthoor ................ G06N 3/063 |
| 2019/0065080 | A1 | 2/2019 | Tanpairoj et al. |
| 2020/0342985 | A1 * | 10/2020 | Toth ........................ G06F 13/14 |
| 2020/0379926 | A1 * | 12/2020 | Gopalakrishnan .......................... G06F 13/1668 |
| 2022/0164117 | A1 | 5/2022 | Guo et al. |
| 2022/0199192 | A1 * | 6/2022 | Binfet ................... G06F 1/3225 |
| 2022/0214979 | A1 * | 7/2022 | Gopalakrishnan .......................... G11C 11/4096 |
| 2022/0413583 | A1 * | 12/2022 | Hassan ................. G06F 3/0625 |
| 2023/0038894 | A1 * | 2/2023 | Lu .......................... G11C 29/26 |
| 2023/0195317 | A1 * | 6/2023 | Yu ........................ G06F 3/0679 711/154 |

* cited by examiner

DUAL DATA CHANNEL PEAK POWER MANAGEMENT

CROSS-REFERENCE TO RELATED APPLICATION(S)

This application claims the benefit of U.S. Provisional Application 63/419,811, filed on Oct. 27, 2022 and entitled "DUAL DATA CHANNEL PEAK POWER MANAGEMENT", the entire contents of which are incorporated by reference herein.

TECHNICAL FIELD

Embodiments of the disclosure relate generally to memory sub-systems, and more specifically, relate to dual data channel peak power management (PPM).

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1A:
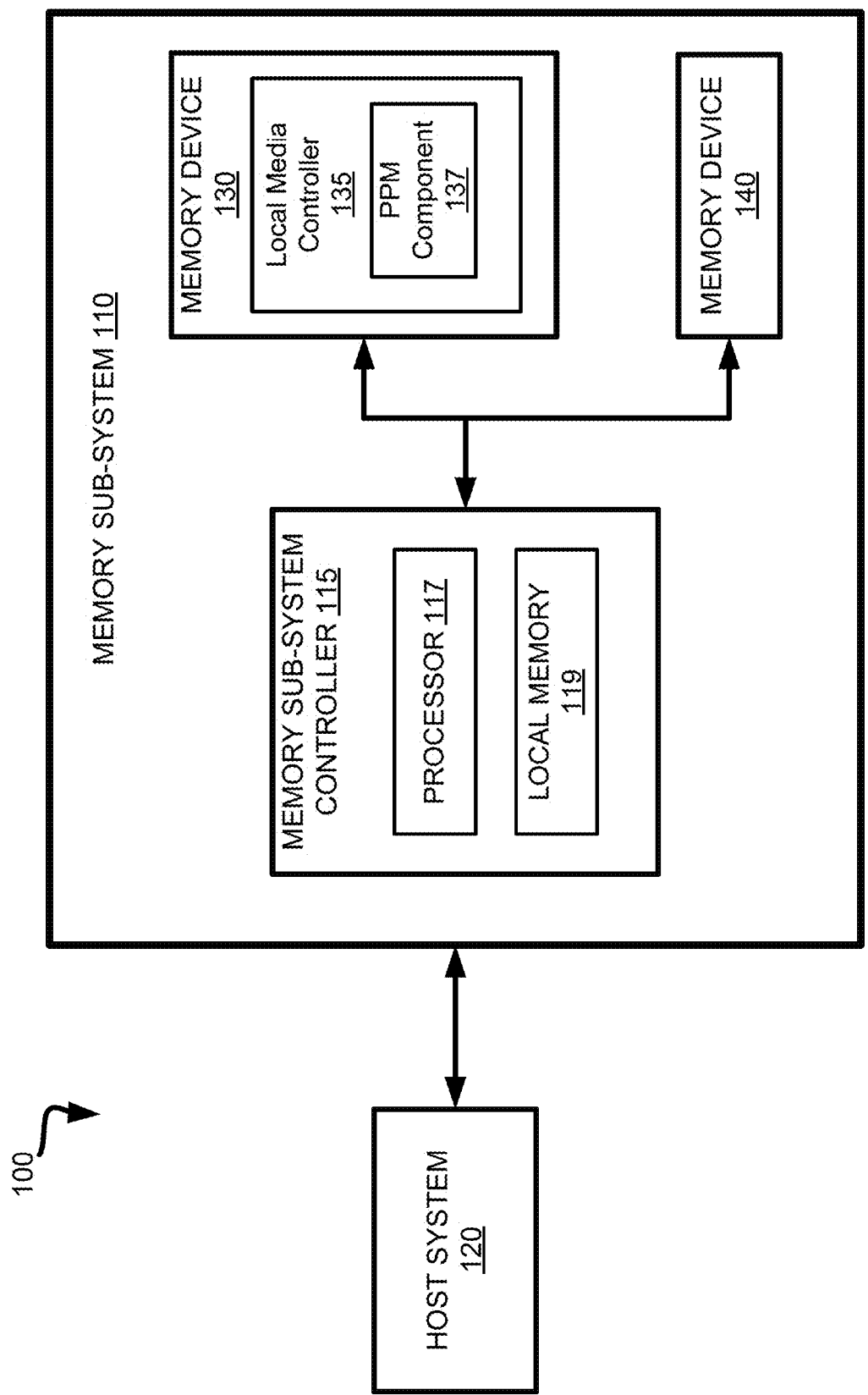
FIG. 1A illustrates an example computing system that includes a memory sub-system in accordance with some embodiments of the present disclosure.

Aspects of the present disclosure are directed to implementing dual data channel peak power management (PPM). A memory sub-system can be a storage device, a memory module, or a combination of a storage device and memory module. Examples of storage devices and memory modules are described below in conjunction with FIGS. 1A-1B. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIGS. 1A-1B. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells. A memory cell is an electronic circuit that stores information. Depending on the memory cell type, a memory cell can store one or more bits of binary information, and has various logic states that correlate to the number of bits being stored. The logic states can be represented by binary values, such as "0" and "1", or combinations of such values.

A memory device can include multiple memory cells arranged in a two-dimensional or three-dimensional grid. The memory cells are formed onto a silicon wafer in an array of columns (also hereinafter referred to as bitlines) and rows (also hereinafter referred to as wordlines). A wordline can refer to one or more conductive lines of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form a plane of the memory device in order to allow concurrent operations to take place on each plane. The memory device can include circuitry that performs concurrent memory page accesses of two or more memory planes. For example, the memory device can include a respective access line driver circuit and power circuit for each plane of the memory device to facilitate concurrent access of pages of two or more memory planes, including different page types. For ease of description, these circuits can be generally referred to as independent plane driver circuits. Control logic on the memory device includes a number of separate processing threads to perform concurrent memory access operations (e.g., read operations, program operations, and erase operations). For example, each processing thread corresponds to a respective one of the memory planes and utilizes the associated independent plane driver circuits to perform the memory access operations on the respective memory plane.

As these processing threads operate independently, the power usage and requirements associated with each processing thread also varies.

A memory device can be a three-dimensional (3D) memory device. For example, a 3D memory device can be a three-dimensional (3D) replacement gate memory device (e.g., 3D replacement gate NAND), which is a memory device with a replacement gate structure using wordline stacking. For example, a 3D replacement gate memory device can include wordlines, select gates, etc. located between sets of layers including a pillar (e.g., polysilicon pillar), a tunnel oxide layer, a charge trap (CT) layer, and a dielectric (e.g., oxide) layer. A 3D replacement gate memory device can have a "top deck" corresponding to a first side and a "bottom deck" corresponding to a second side. For example, the first side can be a drain side and the second side can be a source side. Data in a 3D replacement gate memory device can be stored as 1 bit/memory cell (SLC), 2 bits/memory cell (MLC), 3 bits/memory cell (TLC), etc.

Various access lines, data lines and voltage nodes can be charged or discharged very quickly during sense (e.g., read or verify), program, and erase operations so that memory array access operations can meet the performance specifications that are often required to satisfy data throughput targets as might be dictated by customer requirements or industry standards, for example. For sequential read or programming, multi-plane operations are often used to increase the system throughput. As a result, a memory device can have a high peak current usage, which might be four to five times the average current amplitude. Thus, with such a high average market requirement of total current usage budget, it can become challenging to concurrently operate more than a certain number of memory dies ("dies") of a memory device.

Peak power management (PPM) can be utilized as a technique to manage power consumption of a memory device containing multiple dies, many of which rely on a controller to stagger the activity of the dies seeking to avoid performing high power portions of memory access operations concurrently in more than one die. A PPM system can implement a PPM communication protocol, which is an inter-die communication protocol that can be used for limiting and/or tracking current or power consumed by each die. Each die can include a PPM component that exchanges information with its own local media controller (e.g., NAND controller) and other PPM components of the other dies via a communication bus. Each PPM component can be configured to perform power or current budget arbitration for the respective die. For example, each PPM component can implement predictive PPM to perform predictive power budget arbitration for the respective memory device.

The PPM communication protocol can employ a token-based round robin protocol, whereby each PPM component rotates as a holder of a PPM token in accordance with a token circulation time period. Circulation of the token among the memory devices can be controlled by a common clock signal ("ICLK"). For example, the dies can include a designated primary die that generates the common clock signal received by each active PPM component, with the remaining dies being designated as secondary dies. The token circulation time period can be defined by a number of clock cycles of the common clock signal, and the memory device can pass the token to the next memory device after the number of clock cycles has elapsed.

A die counter can be used to keep track of which die is holding the token. Each die counter value can be univocally associated with a respective die by utilizing a special PPM address for each die. The die counter can be updated upon the passing of the token to the next die.

While holding the token, the PPM component broadcasts, to the other dies, information encoding the amount of current used by its respective die during a given time period (e.g., a quantized current budget). The information can be broadcast using a data line. For example, the data line can be a high current (HC#) data line. The amount of information can be defined by a sequence of bits, where each bit corresponds to the logic level of a data line signal (e.g., an HC# signal) at a respective clock cycle (e.g., a bit has a value of "0" if the HC# signal is logic low during a clock cycle, or a value of "1" if the clock pulse is logic high during a clock cycle). For example, if a die circulates the token after three clock cycles, then the information can include three bits. More specifically, a first bit corresponds to the logic level of the HC# signal during a first clock cycle, a second bit corresponds to the logic level of the HC# signal during a second clock cycle, and a third bit corresponds to the logic level of the HC# signal during the third clock cycle. Accordingly, the token circulation time period (e.g., number of clock cycles) can be defined in accordance with the amount of information to be broadcast by a holder of the token (e.g., number of bits).

While holding the token, the PPM component can issue a request for a certain amount of current to be reserved in order to execute a memory access operation. The system can have a designated maximum current budget, and at least a portion of the maximum current budget may be currently reserved for use by the other memory dies. Thus, an available current budget can be defined as the difference between the maximum current budget and the total amount of reserved current budget during the current token circulation cycle. If the amount of current of the request is less than or equal to the available current budget during the current cycle, then the request is granted and the local media controller can cause the memory access operation to be executed. Otherwise, if the amount of current of the new request exceeds the available current budget, then the local media controller can be forced to wait for sufficient current budget to be made available by the other die(s) to execute the memory access operation (e.g., wait at least one current token circulation cycle).

Each PPM component can maintain the information broadcast by each die (e.g., within respective registers), which enables each die to calculate the current consumption. For example, if there are four dies Die 0 through Die 3, each Die 0 through Die 3 can maintain information broadcast by Die 0 through Die 3 within respective registers designated for Die 0 through Die 3. Since each of Die 0 through Die 3 maintains the maximum current budget the most updated current consumption, each of Die 0 through Die 3 can calculate the available current budget. Accordingly, each of Die 0 through Die 3 can determine whether there is a sufficient amount of available current budget for its local media controller to execute a new memory access operation.

A memory access operation (e.g., program operation, read operation or erase operation) can include multiple sub-operations arranged in an execution sequence. For example, the sub-operations can include an initial sub-operation to initiate the memory access operation, a final sub-operation to complete the memory access operation. The sub-operations can further include at least one intermediate sub-operation performed between the initial sub-operation and the final sub-operation. For each sub-operation, for the local media controller to determine whether there is sufficient available current budget to proceed with execution of the sub-operation, the sub-operation can be assigned a current breakpoint. Each current breakpoint is defined (e.g., as a PPM parameter during initialization of PPM) at the beginning of its respective sub-operation to indicate whether the sub-operation will consume more current, less current, or the same amount of current as the previous sub-operation. Accordingly, current breakpoints can be used as a gating mechanism to control execution of a memory access operation.

For example, a high current (HC) breakpoint indicates that its respective sub-operation will be consuming an amount of current that is greater than the amount of current consumed to execute the previous sub-operation. Thus, the PPM component may have to reserve additional current to enable the local media controller to execute the sub-operation. For example, a first HC breakpoint can be defined with respect to an initial sub-operation of the memory access operation, since the initial sub-operation will necessarily consume a greater amount of current than the zero amount of current that was being consumed immediately before requesting execution of the memory access operation. Upon reaching a HC breakpoint, the local media controller can communicate, with the PPM component, the amount of current that the memory device will be consuming to execute the respective sub-operation. The local media controller waits to receive a response (e.g., flag) indicating that there is sufficient available current budget that can be reserved for executing the respective sub-operation. Upon receiving the response from that PPM component that there is sufficient available current budget that can be reserved for executing the respective sub-operation, the local media controller can proceed with executing the respective sub-operation. Accordingly, the local media controller will execute a sub-operation at a HC breakpoint only if the PPM component indicates that there is sufficient available current in the current budget to do so.

In contrast to a HC breakpoint, a low current (LC) breakpoint indicates that its respective sub-operation will be consuming an amount of current that is less than or equal to the amount of current consumed to execute the previous sub-operation. Since the PPM component had already reserved enough current for executing the previous sub-operation, the local media controller will, upon reaching a LC breakpoint, proceed with executing the respective sub-operation using at least a portion of the already reserved current. However, the local media controller still communicates, with the PPM component, the amount of current that the memory device will be consuming to perform the sub-operation. For example, the PPM component can release an unused portion of the reserved current for the other dies.

Illustratively, if the memory access operation is a read operation, then the read operation can include a prologue sub-operation as the initial sub-operation, a read initialization sub-operation following the prologue sub-operation, a sensing sub-operation following the read initialization sub-operation, and a read recovery sub-operation following the sensing sub-operation. Respective HC breakpoints can be defined for the prologue sub-operation (as the initial sub-operation) and the read initialization sub-operation (since the read initialization sub-operation consumes more current than the prologue sub-operation). Respective LC breakpoints can be defined for the sensing sub-operation (since the sensing sub-operation does not consume more current than the read initialization sub-operation) and the read recovery sub-operation (since the read recovery sub-operation does not consume more current than the sensing sub-operation).

The memory sub-system can include a memory device interface between the memory sub-system controller and a memory device (e.g., NAND memory device) to process multiple different signals relating to one or more transfers or communications with the memory device. For example, the interface can process signals relating to memory access commands (e.g., command/address cycles) to configure the memory device to enable the transfer of raw data in connection with a memory access operation (e.g., a read operation, a program operation, etc.). The interface can implement a multiplexed interface bus including a number of bidirectional input/output (I/O) pins that can transfer address, data and instruction information between the memory sub-system controller and the memory device (e.g., local media controller and I/O control). The I/O pins can be output pins during read operations, and input pins at other times. For example, the interface bus can be an 8-bit bus (I/O [7:0]) or a 16-bit bus (I/O [15:0]).

The interface can further utilize a set of command pins to implement interface protocols. For example, the set of command pins can include a Chip Enable (CE#) pin, an Address Latch Enable (ALE) pin, a Command Latch Enable (CLE) pin, a Write Enable (WE#) pin, a Read Enable (RE#) pin, a data strobe signal (DQS) pin. Additional pins can include, for example, a write protection (WP#) pin that controls hardware write protection, and a ready/busy (RB#) pin that monitors device status and indicates the completion of a memory access operation (e.g., whether the memory device is ready or busy).

The "#" notation indicates that the CE#, WE#, # RE and WP# pins are active when set to a logical low state (e.g., 0 V), also referred to as "active-low" pins. Therefore, the ALE, CLE and DQS pins are active when set to a logical high state (e.g., greater than 0 V), also referred to as "active-high" pins. Asserting a pin can include setting the logical state of the pin to its active logical state, and de-asserting a pin can include setting the logical state of the pin to its inactive logical state. For example, an active-high pin is asserted when set to a logical high state ("driven high") and de-asserted when set to a logical low state ("driven low"), while an active-low pin is asserted when to set to a logical low state ("driven low") and de-asserted when set to a logical high state ("driven high").

CE#, WE#, RE#, CLE, ALE and WP# signals are control signals that can control read and write operations. For example, the CE# pin is an input pin that gates transfers between the host system and the memory device. For example, when the CE# pin is asserted and the memory device is not in a busy state, the memory device can accept command, data and address information. When the memory device is not performing an operation, the CE# pin can be de-asserted.

The RE# pin is an input pin that gates transfers from the memory device to the host system. For example, data can be transferred at the rising edge of RE#. The WE# pin is an input pin that gates transfers from the host system to the memory device. For example, data can be written to a data register on the rising edge of WE# when CE#, CLE and ALE are low and the memory device is not busy.

The ALE pin and the CLE pin are respective input pins. When the ALE pin is driven high, address information can be transferred from the bus into an address register of the memory device upon a low-to-high transition on the WE# pin. More specifically, addresses can be written to the address register on the rising edge of WE# when CE# and CLE are low, ALE is high, and the memory device is not busy. When address information is not being loaded, the ALE pin can be driven low. When the CLE pin is driven high, information can be transferred from the bus to a command register of the memory device. More specifically, commands can be written to the command register on the rising edge of WE# when CE# and ALE are low, CLE is high, and the memory device is not busy. When command information is not being loaded, the CLE pin can be driven low. Accordingly, a high CLE signal can indicate that a command cycle is occurring, and a high ALE signal can indicate that an address input cycle is occurring.

One type of data transfer is a data burst transfer ("data burst"), which refers to a continuous set of data input or data output transfer cycles that are performed without pause. A data burst can be initiated by specifying a set of parameters including a starting memory address from where to begin the data transfer, and an amount of data to be transferred. After the data burst is initiated, it runs to completion, using as many interface bus transactions as necessary to transfer the amount of data designated by the set of parameters. Due at least in part to specifying the set of parameters, the data burst process can generate an overhead penalty with respect to pre-transfer instruction execution. However, since the data burst can continue without any processor involvement after the initiation, processing resources can be freed up for other tasks. One example of a data burst is a read burst. Another example of a data burst is a write burst.

Data bursts are generally fast (e.g., about 1-2 microseconds) and asynchronous events (e.g., a memory device cannot forecast when a data burst will occur). Due to the speed of data bursts, and other types of fast data transfers involving quick and low overhead current budget requests, information regarding these types of data transfers may be lost during PPM data communication via the HC# data channel. For example, such information can be lost due to token ring delay associated with HC# data channel communication among the dies of the system.

Aspects of the present disclosure address the above and other deficiencies by implementing dual data channel PPM. Embodiments described herein can enable auxiliary data transmission that may be asynchronous with respect to PPM data communication via the HC# data channel. For example, the auxiliary data can include data transmitted for quick and low overhead current budget requests. More specifically, in addition to communicating PPM data via the HC# data channel, a PPM protocol described herein can communicate auxiliary data via an auxiliary data channel different from the HC# data channel.

In some embodiments, the auxiliary data channel is a ready/busy (RB#) data channel. Generally, an RB# signal is used to indicate a ready/busy status of the memory device (i.e., whether the memory device is "ready" to handle a media access operation or is currently "busy" handling a media access operation). In the context of the PPM protocol, PPM can be initiated when the RB# signal is low ("0"), as this indicates that at least one die is in a "busy" state. PPM can stop when the RB# signal is high ("1") as this indicates that all of the dies are in a "ready" state. Accordingly, communicating auxiliary data via the RB# data channel can cause the PPM protocol to stop, even if some dies are in a "busy" state.

To prevent the PPM protocol from stopping during auxiliary data transmission via the RB# data channel, embodiments described herein can implement a PPM start/stop digital filter ("digital filter") to perform RB# data channel toggling and prevent spurious deactivations of the PPM protocol. More specifically, the digital filter can identify when an RB# signal is high ("1") and determine whether an amount of time that the RB# signal is continuously high satisfies a threshold condition. For example, determining whether the amount of time that the RB# signal is continuously high satisfies the threshold condition can include determining whether the amount of time that the RB# signal is continuously high is less than or equal to a threshold amount of time. The threshold amount of time can be based on the length of time of a fast data transfer (e.g., data burst). For example, the threshold amount of time can be between about 1 microsecond to about 2 microseconds. If the amount of time that the RB# signal is continuously high satisfies the threshold condition (e.g., the amount of time that the RB# signal is high is less than or equal to the threshold amount of time), this means that the RB# data channel may currently be used to communicate auxiliary data. Thus, the digital filter can prevent auxiliary data communication via the RB# data channel from causing an inadvertent stoppage of the PPM protocol. Otherwise, if the amount of time that the RB# signal is continuously high does not satisfy the threshold condition (e.g., the amount of time that the RB# signal is high is greater than the threshold amount of time), this means that the RB# signal has been continuously high for an amount of time longer than is needed to communicate the auxiliary data. That is, the RB# data channel is being used to communicate that all of the dies are "ready" for handling a future media access operation. Thus, the digital filter can allow the RB# signal to cause the PPM protocol to stop. The PPM protocol can then be resumed in response to determining that the RB# signal is low ("0"). An example system implementing dual data channel PPM will be described below with reference to FIGS. 5A-5B.

In some embodiments, PPM data transmission via the HC# data channel and auxiliary data transmission via the auxiliary data channel are controlled by a single token within the PPM protocol. That is, the token and die counter used to control HC# data channel communication among the dies can be shared with auxiliary data channel communication. In such embodiments, a die may have to communicate both PPM data and auxiliary data during a same time period (i.e., when in possession of the single token). Further details regarding these embodiments will be described below with reference to FIG. 6A.

In some embodiments, PPM data transmission via the HC# data channel is controlled by a first token of the PPM protocol, and auxiliary data transmission via the auxiliary data channel is controlled by a second token of the PPM protocol different from the first token. That is, the PPM protocol can support two different token ring groups each controlled by a respective token. An auxiliary data frame can include a header to specify the type of auxiliary data being transmitted. Further details regarding these embodiments will be described below with reference to FIG. 6B.

Advantages of the present disclosure include, but are not limited to, improved memory sub-system performance and QoS. For example, embodiments can enable more accurate communication of data bursts during PPM, which can improve power consumption efficiency. Further details regarding implementing dual data channel PPM will now be described in further detail below with reference to FIGS. 1-8.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Pillar, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level memory cells (SLC) can store one bit per memory cell. Other types of memory cells, such as multi-level memory cells (MLCs), triple level memory cells (TLCs), quad-level memory cells (QLCs), and penta-level memory cells (PLCs) can store multiple bits per memory cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local controller 132) on the die and a controller (e.g., memory sub-system controller 115) for media management within the same memory device package. An example of a managed memory device is a managed NAND (MNAND) device.

The local media controller 135 can implement dual data channel PPM. In such an embodiment, PPM component 137 can be implemented using hardware or as firmware, stored on memory device 130, executed by the control logic (e.g., local media controller 135) to perform the operations related to performing a memory access operation during PPM as described herein. In some embodiments, the memory sub-system controller 115 includes at least a portion of PPM component 137. For example, the memory sub-system controller 115 can include a processor 117 (e.g., a processing device) configured to execute instructions stored in local memory 119 for performing the operations described herein.

To implement dual data channel PPM, local media controller 135 can initialize PPM. For example, the local media controller can initialize PPM with respect to a PPM network of the memory sub-system 110 after power up of the memory sub-system 110. The PPM network can include multiple dies forming at least one token ring group. Each token ring group is an ordered group of dies.

For example, the at least one token ring group can include an HC# data channel group for communicating PPM data via the HC# data channel. The HC# data channel group can include a primary die and a number of secondary dies. For example, the first die of the HC# data channel group can be assigned to be the primary die. The primary die can be responsible for controlling the passing of a PPM token for the HC# data channel group via ICLK.

The at least one token ring group can further include an auxiliary data channel group for communicating auxiliary data via an auxiliary data channel (i.e., non-HC# data channel). In some embodiments, the auxiliary data channel group is the same as the HC# data channel group. In these embodiments, a single die counter associated with a single token can control PPM data communication and auxiliary data communication. Further details regarding these embodiments will be described below with reference to FIGS. 6A and 7.

In some embodiments, the auxiliary data channel group is different from the HC# data channel group. In these embodiments, an HC# data channel group die counter associated with a first token can control PPM data communication via the HC# data channel, while an auxiliary data channel group die counter associated with a second token, different from the first token, can separately control auxiliary data communication via the auxiliary data channel. Further details regarding these embodiments will be described below with reference to FIGS. 6B and 7.

Initializing PPM can include initializing a set of PPM parameters. The set of PPM parameters include a number of parameters defining the operation of PPM within the PPM network. For example, the set of PPM parameters can include current budget, the number of die of each token ring group, a size of data packets communicated by each die of each token ring group during a PPM data communication cycle and/or auxiliary data communication cycle (e.g., a token ring resolution defining a number of bits of data), a configuration of the position of each die within each token ring group (i.e., to define the order of the dies within the token ring group), etc.

The PPM component 137 can receive a token from another die of the auxiliary data group. The PPM component 137 can determine whether to communicate auxiliary data in response to receiving the token. For example, control logic can determine whether any auxiliary data is eligible for communication via the auxiliary data channel during the current cycle. For example, the auxiliary data can include data related to a fast data transfer (e.g., data burst) to be handled by the die in possession of the token.

If it is determined that there is auxiliary data to be communicated, then the auxiliary data can be communicated. For example, the PPM component 137 can cause the auxiliary data to be communicated to the other dies of the token ring group via the auxiliary data channel during the current cycle. More specifically, control logic can cause the auxiliary data to be communicated to the other dies via their respective PPM components. Similar to PPM data communicated via the HC# signal, the auxiliary data can be communicated as a data packet having the data packet size.

In some embodiments, the auxiliary data channel is an RB# data channel associated with an RB# signal. The PPM component 137 can include a digital filter that can be used to perform RB# data channel toggling and prevent spurious deactivations of the PPM protocol. More specifically, the digital filter can identify when an RB# signal is high ("1"), and determine whether an amount of time that the RB# signal is continuously high satisfies a threshold condition. For example, determining whether the amount of time that the RB# signal is continuously high satisfies the threshold condition can include determining whether the amount of time that the RB# signal is continuously high is less than or equal to a threshold amount of time. The threshold amount of time can be based on the length of time of a fast data transfer (e.g., data burst). For example, the threshold amount of time can be between about 1 microseconds to about 2 microseconds. If the amount of time that the RB# signal is continuously high satisfies the threshold condition (e.g., the amount of time that the RB# signal is high is less than or equal to the threshold amount of time), this means that the RB# data channel may currently be used to communicate auxiliary data. Thus, the digital filter can prevent auxiliary data communication via the RB# data channel from causing an inadvertent stoppage of the PPM protocol. Otherwise, if the amount of time that the RB# signal is continuously high does not satisfy the threshold condition (e.g., the amount of time that the RB# signal is high is greater than the threshold amount of time), this means that the RB# signal has been continuously high for an amount of time longer than is needed to communicate the auxiliary data. That is, the RB# data channel is being used to communicate that all of the dies are "ready" for handling a future media access operation. Thus, the digital filter can allow the RB# signal to cause the PPM protocol to stop. The PPM protocol can then be resumed in response to determining that the RB# signal is low ("0"). Further details regarding implementing the digital filter will be described below with reference to FIGS. 5A-5B.

After communicating the auxiliary data to the other dies, or after determining not to communicate the auxiliary data, the PPM component 137 can cause the token to be passed to the next die of the token ring group. Further details regarding implementing dual data channel PPM will now be described below with reference to FIGS. 1B-8.

Figure 1B:
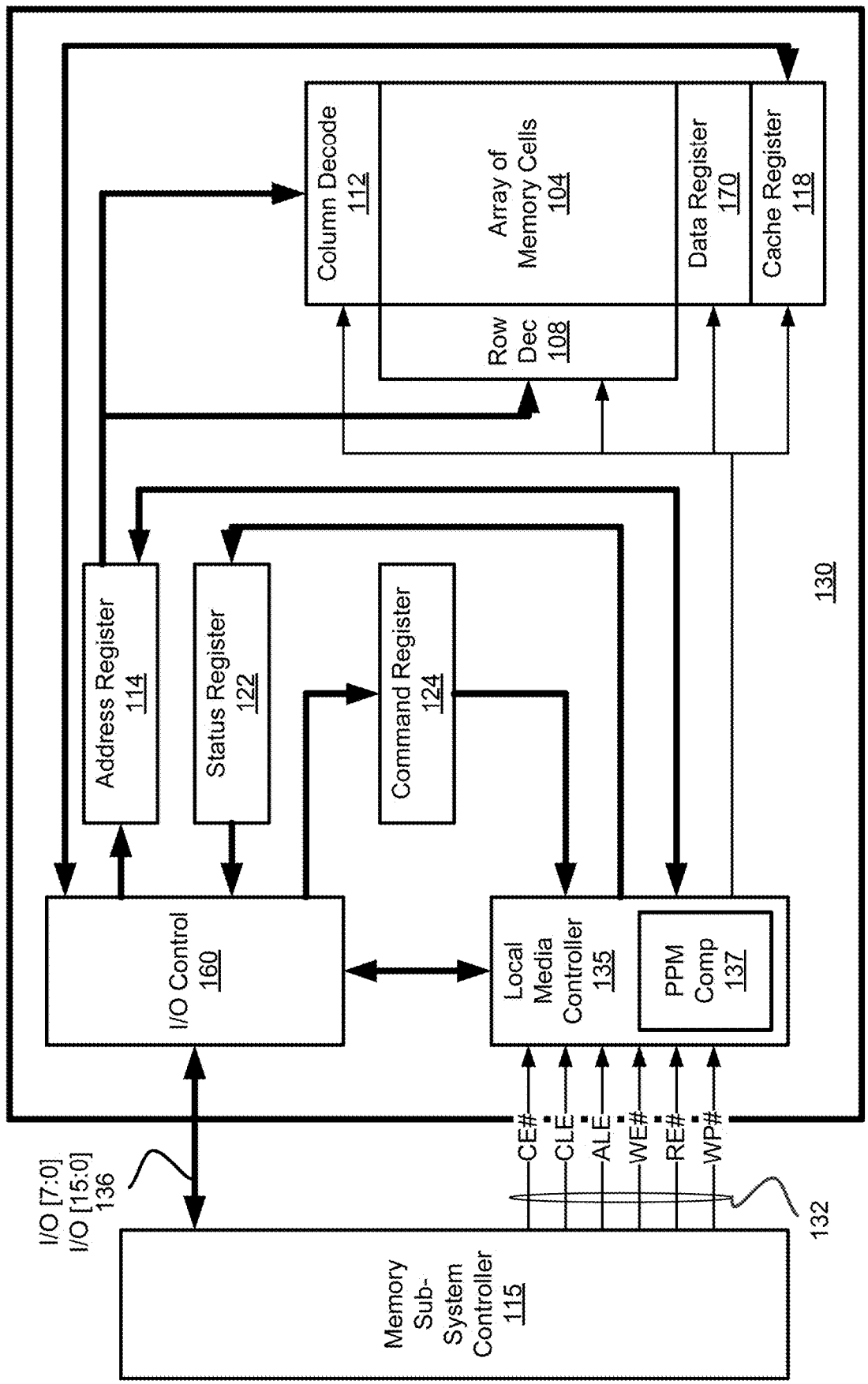
FIG. 1B is a block diagram of a memory device in communication with a memory sub-system controller of a memory sub-system in accordance with some embodiments of the present disclosure.

FIG. 1B is a simplified block diagram of a first apparatus, in the form of a memory device 130, in communication with a second apparatus, in the form of a memory sub-system controller 115 of a memory sub-system (e.g., memory sub-system 110 of FIG. 1A), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), may be a memory controller or other external host device.

Memory device 130 includes an array of memory cells 104 logically arranged in rows and columns. Memory cells of a logical row are typically connected to the same access line (e.g., a wordline) while memory cells of a logical column are typically selectively connected to the same data line (e.g., a bitline). A single access line may be associated with more than one logical row of memory cells and a single data line may be associated with more than one logical column. Memory cells (not shown in FIG. 1B) of at least a portion of array of memory cells 104 are capable of being programmed to one of at least two target data states.

Row decode circuitry 108 and column decode circuitry 112 are provided to decode address signals. Address signals are received and decoded to access the array of memory cells 104. Memory device 130 also includes input/output (I/O) control circuitry 160 to manage input of commands, addresses and data to the memory device 130 as well as output of data and status information from the memory device 130. An address register 114 is in communication with I/O control circuitry 160 and row decode circuitry 108 and column decode circuitry 112 to latch the address signals prior to decoding. A command register 124 is in communication with I/O control circuitry 160 and local media controller 135 to latch incoming commands.

A controller (e.g., the local media controller 135 internal to the memory device 130) controls access to the array of memory cells 104 in response to the commands and generates status information for the external memory sub-system controller 115, i.e., the local media controller 135 is configured to perform access operations (e.g., read operations, programming operations and/or erase operations) on the array of memory cells 104. The local media controller 135 is in communication with row decode circuitry 108 and column decode circuitry 112 to control the row decode circuitry 108 and column decode circuitry 112 in response to the addresses. In one embodiment, local media controller 135 includes the PPM component 137, which can implement the defect detection described herein during an erase operation on memory device 130.

The local media controller 135 is also in communication with a cache register 118. Cache register 118 latches data, either incoming or outgoing, as directed by the local media controller 135 to temporarily store data while the array of memory cells 104 is busy writing or reading, respectively, other data. During a program operation (e.g., write operation), data may be passed from the cache register 118 to the data register 170 for transfer to the array of memory cells 104; then new data may be latched in the cache register 118 from the I/O control circuitry 160. During a read operation, data may be passed from the cache register 118 to the I/O control circuitry 160 for output to the memory sub-system controller 115; then new data may be passed from the data register 170 to the cache register 118. The cache register 118 and/or the data register 170 may form (e.g., may form a portion of) a page buffer of the memory device 130. A page buffer may further include sensing devices (not shown in FIG. 1B) to sense a data state of a memory cell of the array of memory cells 204, e.g., by sensing a state of a data line connected to that memory cell. A status register 122 may be in communication with I/O control circuitry 160 and the local memory controller 135 to latch the status information for output to the memory sub-system controller 115.

Memory device 130 receives control signals at the memory sub-system controller 115 from the local media controller 135 over a control link 132. For example, the control signals can include a chip enable signal CE#, a command latch enable signal CLE, an address latch enable signal ALE, a write enable signal WE#, a read enable signal RE#, and a write protect signal WP#. Additional or alternative control signals (not shown) may be further received over control link 132 depending upon the nature of the memory device 130. In one embodiment, memory device 130 receives command signals (which represent commands), address signals (which represent addresses), and data signals (which represent data) from the memory sub-system controller 115 over a multiplexed input/output (I/O) bus 136 and outputs data to the memory sub-system controller 115 over I/O bus 136.

For example, the commands may be received over input/output (I/O) pins [7:0] of I/O bus 136 at I/O control circuitry 160 and may then be written into command register 124. The addresses may be received over input/output (I/O) pins [7:0] of I/O bus 136 at I/O control circuitry 160 and may then be written into address register 114. The data may be received over input/output (I/O) pins [7:0] for an 8-bit device or input/output (I/O) pins [15:0] for a 16-bit device at I/O control circuitry 160 and then may be written into cache register 118. The data may be subsequently written into data register 170 for programming the array of memory cells 104.

In an embodiment, cache register 118 may be omitted, and the data may be written directly into data register 170. Data may also be output over input/output (I/O) pins [7:0] for an 8-bit device or input/output (I/O) pins [15:0] for a 16-bit device. Although reference may be made to I/O pins, they may include any conductive node providing for electrical connection to the memory device 130 by an external device (e.g., the memory sub-system controller 115), such as conductive pads or conductive bumps as are commonly used.

It will be appreciated by those skilled in the art that additional circuitry and signals can be provided, and that the memory device 130 of FIGS. 1A-1B has been simplified. It should be recognized that the functionality of the various block components described with reference to FIGS. 1A-1B may not necessarily be segregated to distinct components or component portions of an integrated circuit device. For example, a single component or component portion of an integrated circuit device could be adapted to perform the functionality of more than one block component of FIGS. 1A-1B. Alternatively, one or more components or component portions of an integrated circuit device could be combined to perform the functionality of a single block component of FIGS. 1A-1B. Additionally, while specific I/O pins are described in accordance with popular conventions for receipt and output of the various signals, it is noted that other combinations or numbers of I/O pins (or other I/O node structures) may be used in the various embodiments.

Figure 2A:
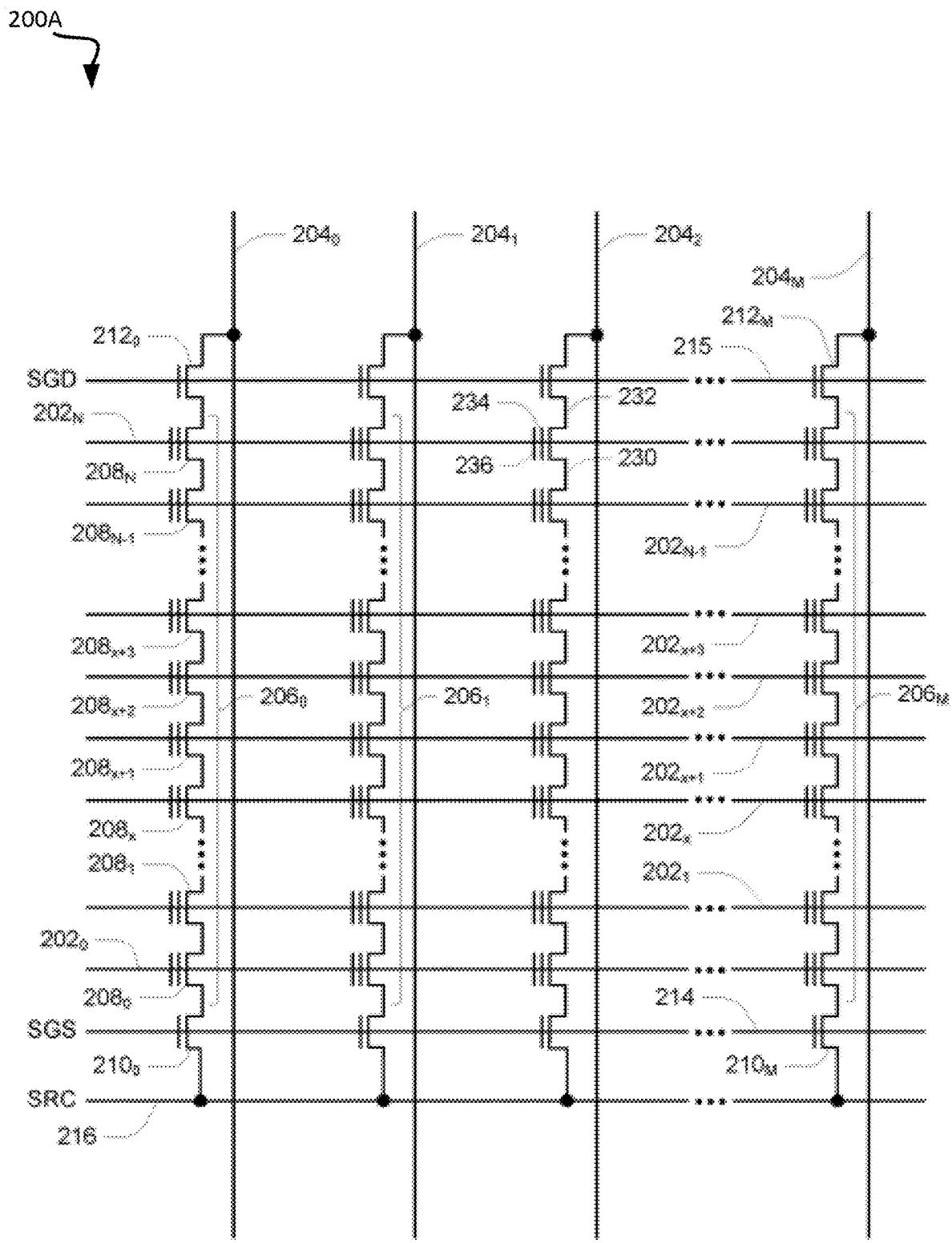
FIGS. 2A-2C are diagrams of portions of an example array of memory cells included in a memory device, in accordance with some embodiments of the present disclosure.
Figure 2B:
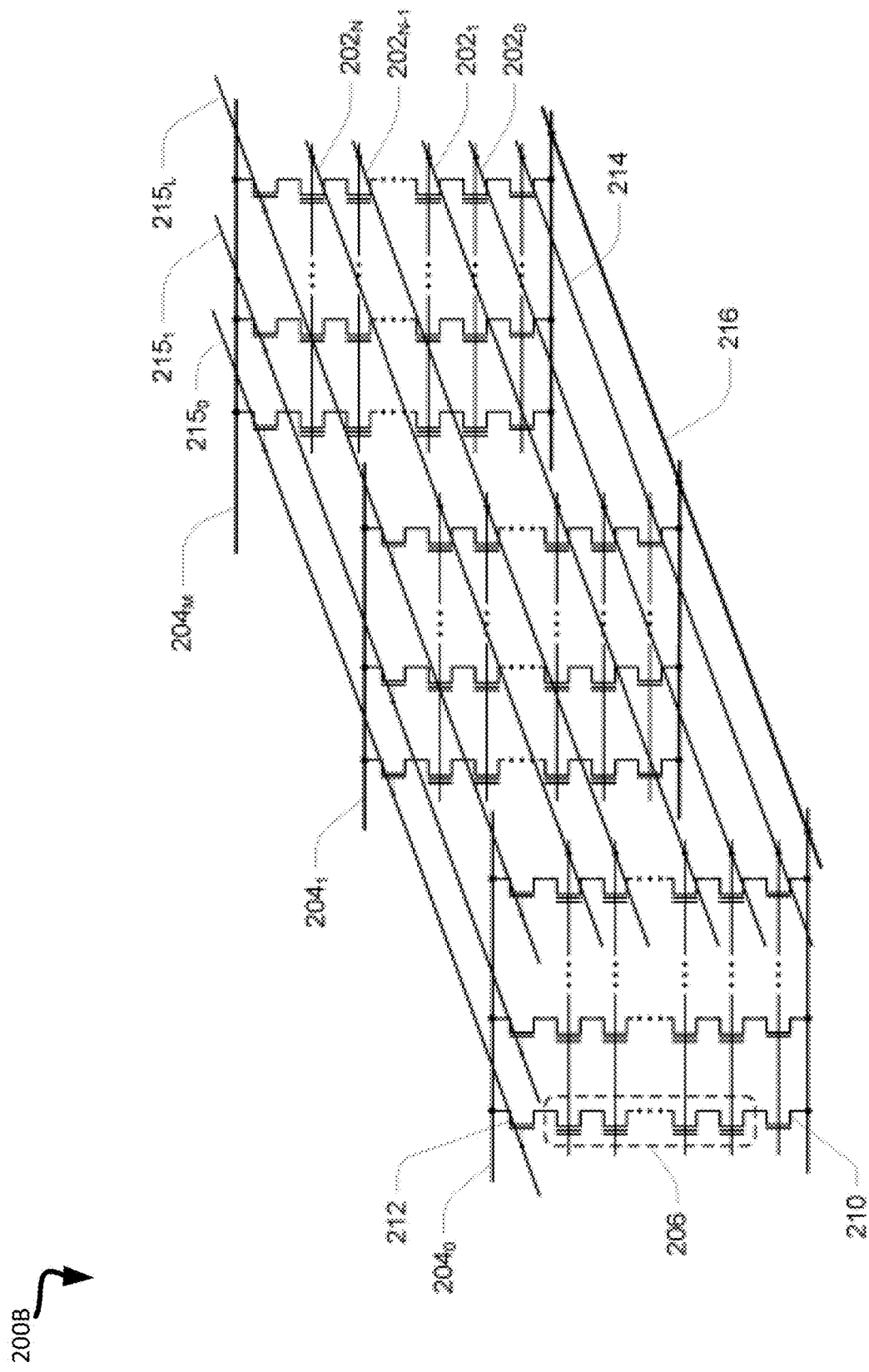
Figure 2C:
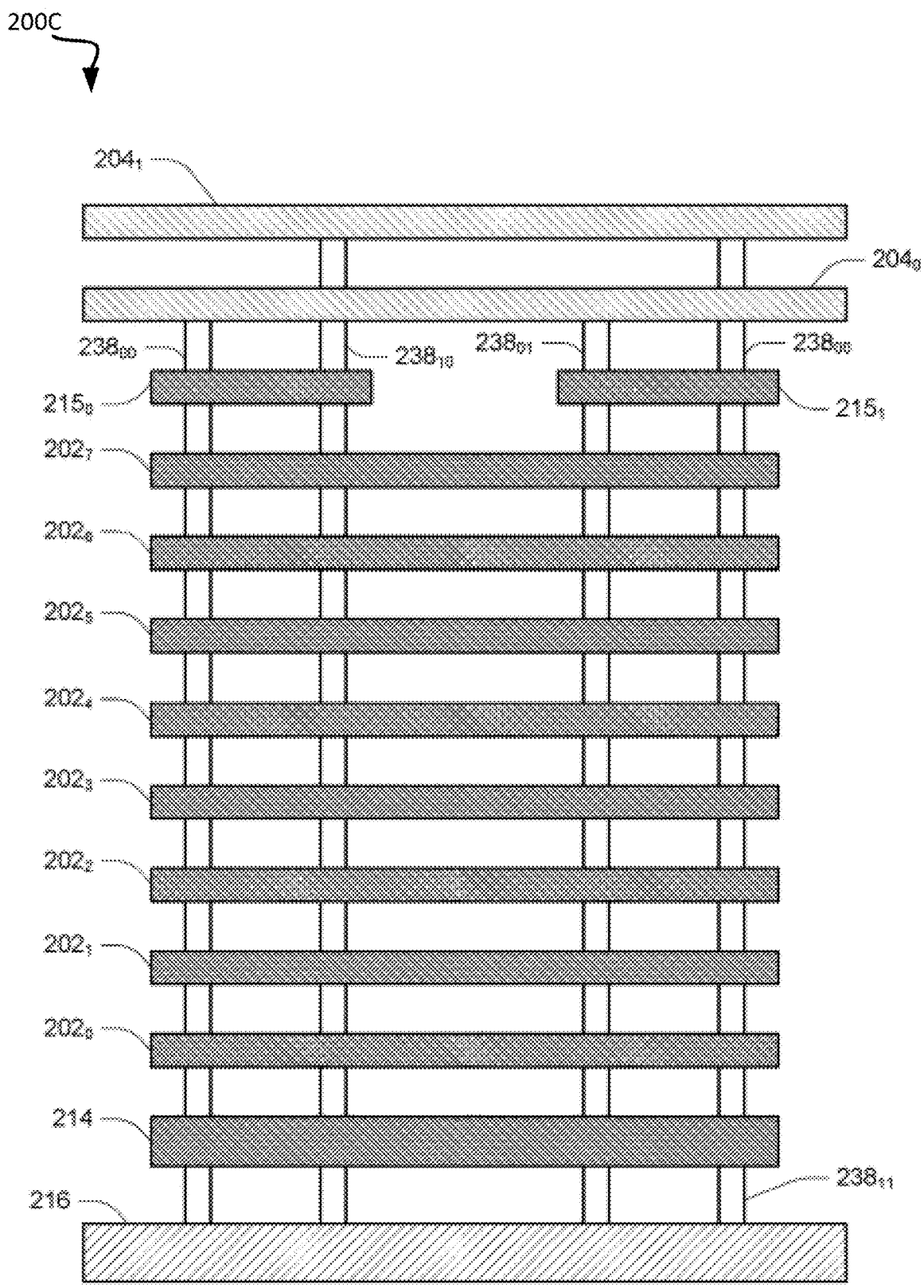

FIGS. 2A-2C are diagrams of portions of an example array of memory cells included in a memory device, in accordance with some embodiments of the present disclosure. For example, FIG. 2A is a schematic of a portion of an array of memory cells 200A as could be used in a memory device (e.g., as a portion of array of memory cells 104). Memory array 200A includes access lines, such as wordlines $202_0$ to $202_N$, and a data line, such as bitline 204. The wordlines 202 may be connected to global access lines (e.g., global wordlines), not shown in FIG. 2A, in a many-to-one relationship. For some embodiments, memory array 200A may be formed over a semiconductor that, for example, may be conductively doped to have a conductivity type, such as a p-type conductivity, e.g., to form a p-well, or an n-type conductivity, e.g., to form an n-well.

Memory array 200A can be arranged in rows each corresponding to a respective wordline 202 and columns each corresponding to a respective bitline 204. Rows of memory cells 208 can be divided into one or more groups of physical pages of memory cells 208, and physical pages of memory cells 208 can include every other memory cell 208 commonly connected to a given wordline 202. For example, memory cells 208 commonly connected to wordline $202_N$ and selectively connected to even bitlines 204 (e.g., bitlines $204_0$, $204_2$, $204_4$, etc.) may be one physical page of memory cells 208 (e.g., even memory cells) while memory cells 208 commonly connected to wordline $202_N$ and selectively connected to odd bitlines 204 (e.g., bitlines $204_1$, $204_3$, $204_5$, etc.) may be another physical page of memory cells 208 (e.g., odd memory cells). Although bitlines $204_3$-$204_5$ are not explicitly depicted in FIG. 2A, it is apparent from the figure that the bitlines 204 of the array of memory cells 200A may be numbered consecutively from bitline $204_0$ to bitline $204_M$. Other groupings of memory cells 208 commonly connected to a given wordline 202 may also define a physical page of memory cells 208. For certain memory devices, all memory cells commonly connected to a given wordline might be deemed a physical page of memory cells. The portion of a physical page of memory cells (which, in some embodiments, could still be the entire row) that is read during a single read operation or programmed during a single programming operation (e.g., an upper or lower page of memory cells) might be deemed a logical page of memory cells. A block of memory cells may include those memory cells that are configured to be erased together, such as all memory cells connected to wordlines $202_0$-$202_N$ (e.g., all strings 206 sharing common wordlines 202). Unless expressly distinguished, a reference to a page of memory cells herein refers to the memory cells of a logical page of memory cells.

Each column can include a string of series-connected memory cells (e.g., non-volatile memory cells), such as one of strings $206_0$ to $206_M$. Each string 206 can be connected (e.g., selectively connected) to a source line 216 (SRC) and can include memory cells $208_0$ to $208_N$. The memory cells 208 of each string 206 can be connected in series between a select gate 210, such as one of the select gates $210_0$ to $210_M$, and a select gate 212, such as one of the select gates $212_0$ to $212_M$. In some embodiments, the select gates $210_0$ to $210_M$ are source-side select gates (SGS) and the select gates $212_0$ to $212_M$ are drain-side select gates. Select gates $210_0$ to $210_M$ can be connected to a select line 214 (e.g., source-side select line) and select gates $212_0$ to $212_M$ can be connected to a select line 215 (e.g., drain-side select line). The select gates 210 and 212 might represent a plurality of select gates connected in series, with each select gate in series configured to receive a same or independent control signal. A source of each select gate 210 can be connected to SRC 216, and a drain of each select gate 210 can be connected to a memory cell $208_0$ of the corresponding string 206. Therefore, each select gate 210 can be configured to selectively connect a corresponding string 206 to SRC 216. A control gate of each select gate 210 can be connected to select line 214. The drain of each select gate 212 can be connected to the bitline 204 for the corresponding string 206. The source of each select gate 212 can be connected to a memory cell 208N of the corresponding string 206. Therefore, each select gate 212 might be configured to selectively connect a corresponding string 206 to the bitline 204. A control gate of each select gate 212 can be connected to select line 215.

In some embodiments, and as will be described in further detail below with reference to FIG. 2B, the memory array in FIG. 2A is a three-dimensional memory array, in which the strings 206 extend substantially perpendicular to a plane containing SRC 216 and to a plane containing a plurality of bitlines 204 that can be substantially parallel to the plane containing SRC 216.

FIG. 2B is another schematic of a portion of an array of memory cells 200B (e.g., a portion of the array of memory cells 104) arranged in a three-dimensional memory array structure. The three-dimensional memory array 200B may incorporate vertical structures which may include semiconductor pillars where a portion of a pillar may act as a channel region of the memory cells of strings 206. The strings 206 may be each selectively connected to a bit line $204_0$-$204_M$ by a select gate 212 and to the SRC 216 by a select gate 210. Multiple strings 206 can be selectively connected to the same bitline 204. Subsets of strings 206 can be connected to their respective bitlines 204 by biasing the select lines $215_0$-$215_L$ to selectively activate particular select gates 212 each between a string 206 and a bitline 204. The select gates 210 can be activated by biasing the select line 214. Each wordline 202 may be connected to multiple rows of memory cells of the memory array 200B. Rows of memory cells that are commonly connected to each other by a particular wordline 202 may collectively be referred to as tiers.

FIG. 2C is a diagram of a portion of an array of memory cells 200C (e.g., a portion of the array of memory cells 104). Channel regions (e.g., semiconductor pillars) $238_{00}$ and $238_{01}$ represent the channel regions of different strings of series-connected memory cells (e.g., strings 206 of FIGS. 2A-2B) selectively connected to the bitline $204_0$. Similarly, channel regions $238_{10}$ and $238_{11}$ represent the channel regions of different strings of series-connected memory cells (e.g., NAND strings 206 of FIGS. 2A-2B) selectively connected to the bitline $204_1$. A memory cell (not depicted in FIG. 2C) may be formed at each intersection of a wordline 202 and a channel region 238, and the memory cells corresponding to a single channel region 238 may collectively form a string of series-connected memory cells (e.g., a string 206 of FIGS. 2A-2B). Additional features might be common in such structures, such as dummy wordlines, segmented channel regions with interposed conductive regions, etc.

Figure 3:
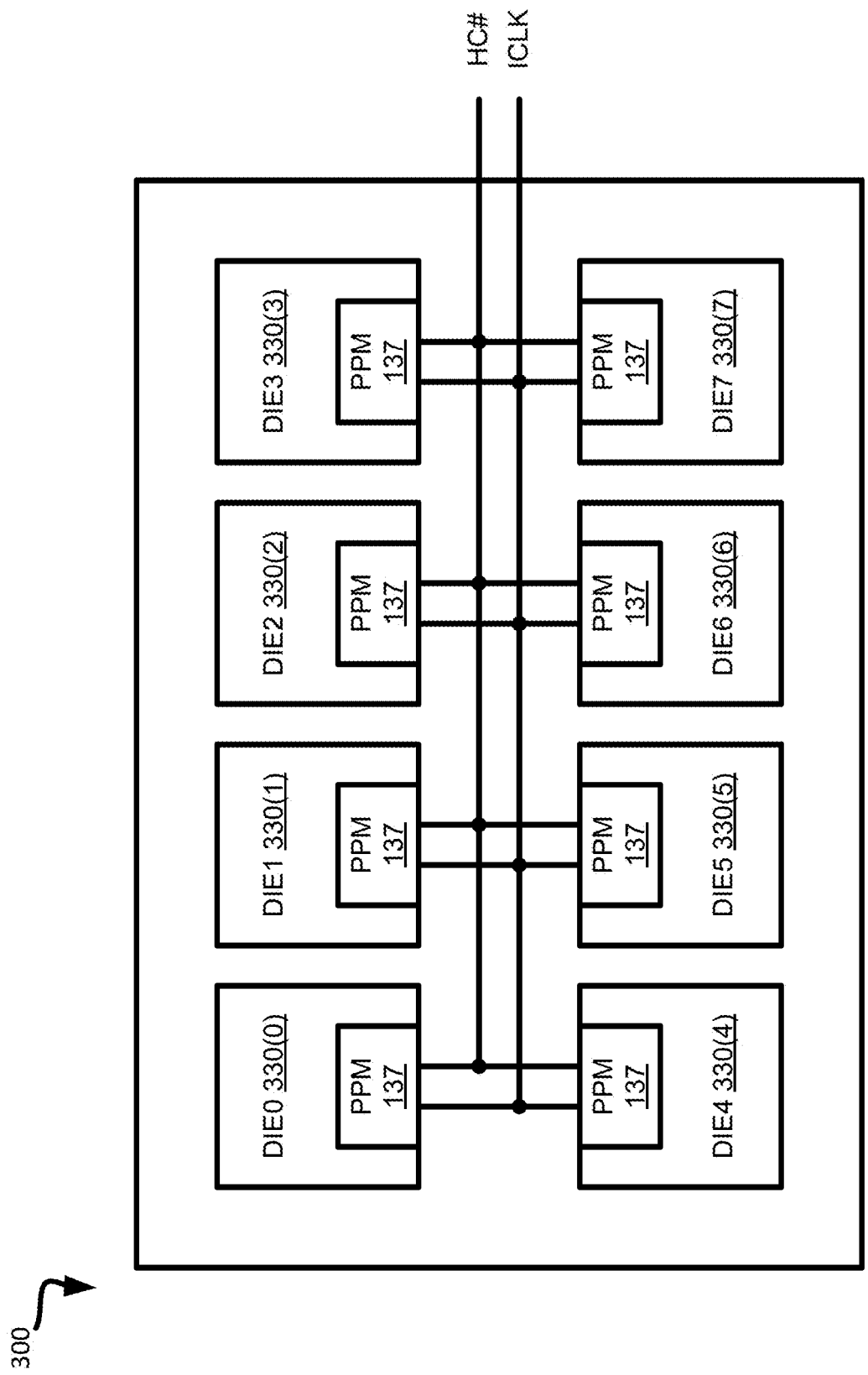
FIG. 3 is a block diagram illustrating a multi-die package with multiple memory dies in a memory sub-system, in accordance with some embodiments of the present disclosure.

FIG. 3 is a block diagram illustrating a multi-die package 300 with multiple memory dies in a memory sub-system, in accordance with some embodiments of the present disclosure. As illustrated, multi-die package 300 includes memory dies 330(0)-330(7). In other embodiments, however, multi-die package 300 can include some other number of memory dies, such as additional or fewer memory dies. In one embodiment, memory dies 330(0)-330(7) share a clock signal ICLK which is received via a clock signal line. Memory dies 330(0)-330(7) can be selectively enabled in response to a chip enable signal (e.g., via a control link), and can communicate over a separate I/O bus. In addition, a peak current magnitude indicator signal HC# is commonly shared between the memory dies 330(0)-330(7). The peak current magnitude indicator signal HC# can be normally pulled to a particular state (e.g., pulled high). In one embodiment, each of memory dies 330(0)-330(7) includes an instance of PPM component 137, which receives both the clock signal ICLK and the peak current magnitude indicator signal HC#.

In one embodiment, a token-based protocol is used where a token cycles through each of the memory dies 330(0)-330(7) for determining and broadcasting expected peak current magnitude, even though some of the memory dies 330(0)-330(7) might be disabled in response to their respective chip enable signal. The period of time during which a given PPM component 137 holds this token (e.g., a certain number of cycles of clock signal ICLK) can be referred to herein as a power management cycle of the associated memory die. At the end of the power management cycle, the token is passed to another memory die. Eventually the token is received again by the same PPM component 137, which signals the beginning of the power management cycle for the associated memory die. In one embodiment, the encoded value for the lowest expected peak current magnitude is configured such that each of its digits correspond to the normal logic level of the peak current magnitude indicator signal HC# where the disabled dies do not transition the peak current magnitude indicator signal HC#. In other embodiments, however, the memory dies can be configured, when otherwise disabled in response to their respective chip enable signal, to drive transitions of the peak current magnitude indicator signal HC# to indicate the encoded value for the lowest expected peak current magnitude upon being designated. When a given PPM component 137 holds the token, it can determine the peak current magnitude for the respective one of memory die 330(0)-330(7), which can be attributable to one or more processing threads on that memory die, and broadcast an indication of the same via the peak current magnitude indicator signal HC#. During a given power management cycle, the PPM component 137 can arbitrate among the multiple processing threads on the respective memory die using one of a number of different arbitration schemes in order to allocate that peak current to enable concurrent memory access operations.

Figure 4:
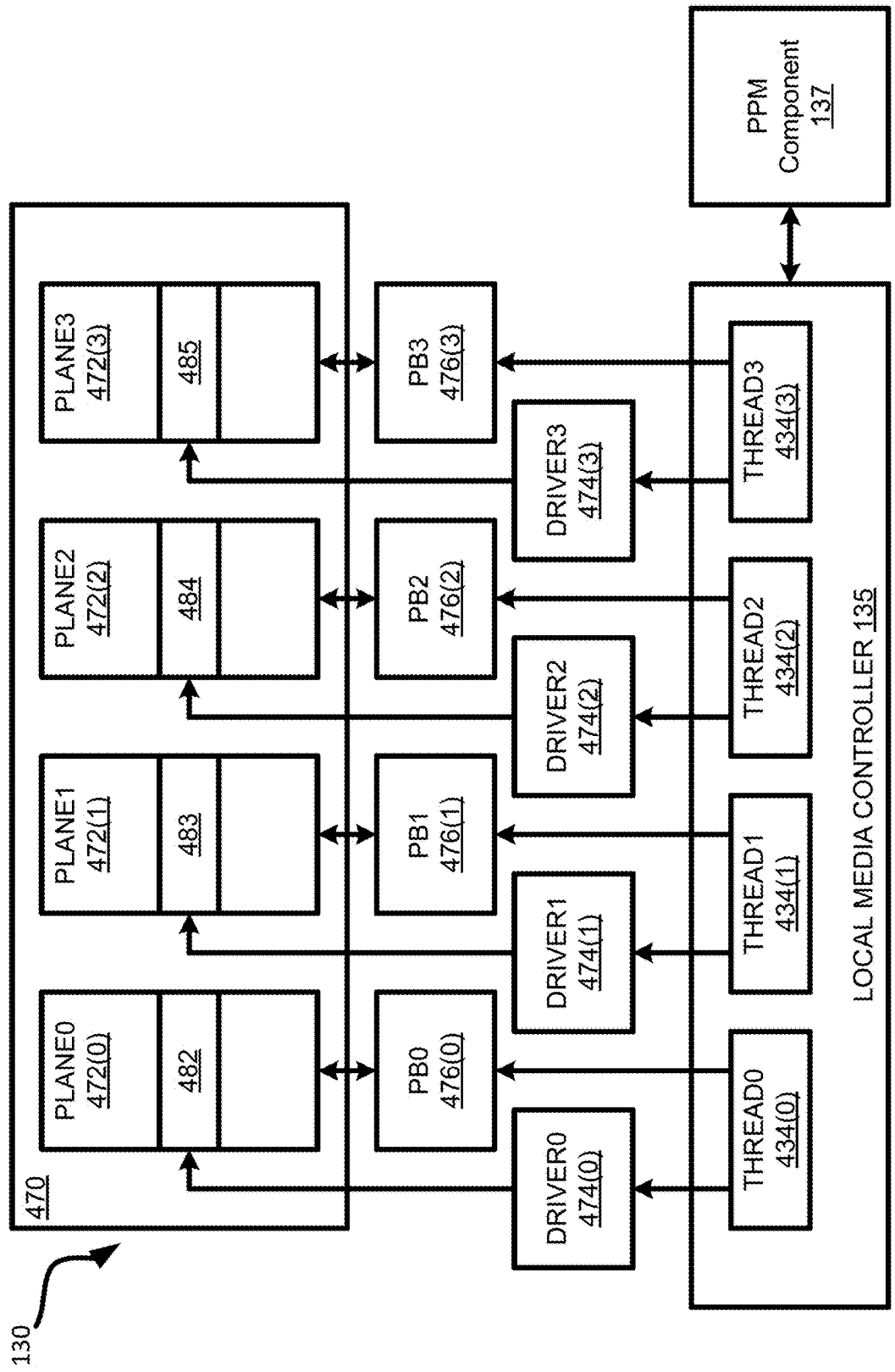
FIG. 4 is a block diagram illustrating a multi-plane memory device configured for independent parallel plane access, in accordance with some embodiments of the present disclosure.

FIG. 4 is a block diagram illustrating a multi-plane memory device 130 configured for independent parallel plane access, in accordance with some embodiments of the present disclosure. The memory planes 472(0)-472(3) can each be divided into blocks of data, with a different relative block of data from two or more of the memory planes 472(0)-472(3) concurrently accessible during memory access operations. For example, during memory access operations, two or more of data block 482 of the memory plane 472(0), data block 483 of the memory plane 472(1), data block 484 of the memory plane 472(2), and data block 485 of the memory plane 4372(3) can each be accessed concurrently.

The memory device 130 includes a memory array 470 divided into memory planes 472(0)-472(3) that each includes a respective number of memory cells. The multi-plane memory device 130 can further include local media controller 135, including a power control circuit and access control circuit for concurrently performing memory access operations for different memory planes 472(0)-472(3). The memory cells can be non-volatile memory cells, such as NAND flash cells, or can generally be any type of memory cells.

The memory planes 472(0)-472(3) can each be divided into blocks of data, with a different relative block of data from each of the memory planes 472(0)-472(3) concurrently accessible during memory access operations. For example, during memory access operations, data block 482 of the memory plane 472(0), data block 483 of the memory plane 472(1), data block 484 of the memory plane 472(2), and data block 485 of the memory plane 472(3) can each be accessed concurrently.

Each of the memory planes 472(0)-372(3) can be coupled to a respective page buffer 476(0)-476(3). Each page buffer 476(0)-376(3) can be configured to provide data to or receive data from the respective memory plane 472(0)-472(3). The page buffers 476(0)-476(3) can be controlled by local media controller 135. Data received from the respective memory plane 472(0)-472(3) can be latched at the page buffers 476(0)-476(3), respectively, and retrieved by local media controller 135, and provided to the memory sub-system controller 115 via the interface.

Each of the memory planes 472(0)-472(3) can be further coupled to a respective access driver circuit 474(0)-474(3), such as an access line driver circuit. The driver circuits 474(0)-474(3) can be configured to condition a page of a respective block of an associated memory plane 472(0)-472(3) for a memory access operation, such as programming data (i.e., writing data), reading data, or erasing data. Each of the driver circuits 474(0)-474(3) can be coupled to a respective global access lines associated with a respective memory plane 472(0)-472(3). Each of the global access lines can be selectively coupled to respective local access lines within a block of a plane during a memory access operation associated with a page within the block. The driver circuits 474(0)-474(3) can be controlled based on signals from local media controller 135. Each of the driver circuits 474(0)-474(3) can include or be coupled to a respective power circuit, and can provide voltages to respective access lines based on voltages provided by the respective power circuit. The voltages provided by the power circuits can be based on signals received from local media controller 135.

The local media controller 135 can control the driver circuits 474(0)-474(3) and page buffers 476(0)-476(3) to concurrently perform memory access operations associated with each of a group of memory command and address pairs (e.g., received from memory sub-system controller 115). For example, local media controller 135 can control the driver circuits 474(0)-474(3) and page buffer 476(0)-476(3) to perform the concurrent memory access operations. Local media controller 135 can include a power control circuit that serially configures two or more of the driver circuits 474(0)-474(3) for the concurrent memory access operations, and an access control circuit configured to control two or more of the page buffers 476(0)-476(3) to sense and latch data from the respective memory planes 472(0)-472(3), or program data to the respective memory planes 472(0)-472(3) to perform the concurrent memory access operations.

In operation, local media controller 135 can receive a group of memory command and address pairs via the bus, with each pair arriving in parallel or serially. In some examples, the group of memory command and address pairs can each be associated with different respective memory planes 472(0)-472(3) of the memory array 470. The local media controller 135 can be configured to perform concurrent memory access operations (e.g., read operations or program operations) for the different memory planes 472(0)-472(3) of the memory array 470 responsive to the group of memory command and address pairs. For example, the power control circuit of local media controller 135 can serially configure, for the concurrent memory access operations based on respective page type (e.g., UP, TP, LP, XP, SLC/MLC/TLC/QLC page), the driver circuits 474(0)-474(3) for two or more memory planes 472(0)-472(3) associated with the group of memory command and address pairs. After the access line driver circuits 474(0)-474(3) have been configured, the access control circuit of local media controller 135 can concurrently control the page buffers 476(0)-476(3) to access the respective pages of each of the two or more memory planes 472(0)-472(3) associated with the group of memory command and address pairs, such as retrieving data or writing data, during the concurrent memory access operations. For example, the access control circuit can concurrently (e.g., in parallel and/or contemporaneously) control the page buffers 476(0)-476(3) to charge/discharge bitlines, sense data from the two or more memory planes 472(0)-472(3), and/or latch the data.

Based on the signals received from local media controller 135, the driver circuits 474(0)-474(3) that are coupled to the memory planes 472(0)-472(3) associated with the group of memory command and address command pairs can select blocks of memory or memory cells from the associated memory plane 472(0)-472(3), for memory operations, such as read, program, and/or erase operations. The driver circuits 474(0)-474(3) can drive different respective global access lines associated with a respective memory plane 472(0)-472(3). As an example, the driver circuit 474(0) can drive a first voltage on a first global access line associated with the memory plane 472(0), the driver circuit 474(1) can drive a second voltage on a third global access line associated with the memory plane 472(1), the driver circuit 474(2) can drive a third voltage on a seventh global access line associated with the memory plane 472(2), etc., and other voltages can be driven on each of the remaining global access lines. In some examples, pass voltages can be provided on all access lines except an access line associated with a page of a memory plane 472(0)-472(3) to be accessed. The local media controller 135, the driver circuits 474(0)-474(3) can allow different respective pages, and the page buffers 476(0)-476(3) within different respective blocks of memory cells, to be accessed concurrently. For example, a first page of a first block of a first memory plane can be accessed concurrently with a second page of a second block of a second memory plane, regardless of page type.

The page buffers 476(0)-476(3) can provide data to or receive data from the local media controller 135 during the memory access operations responsive to signals from the local media controller 135 and the respective memory planes 472(0)-472(3). The local media controller 135 can provide the received data to memory sub-system controller 115.

It will be appreciated that the memory device 130 can include more or less than four memory planes, driver circuits, and page buffers. It will also be appreciated that the respective global access lines can include 8, 16, 32, 64, 128, etc., global access lines. The local media controller 135 and the driver circuits 474(0)-474(3) can concurrently access different respective pages within different respective blocks of different memory planes when the different respective pages are of a different page type. For example, local media controller 135 can include a number of different processing threads, such as processing threads 434(0)-434(3). Each of processing threads 434(0)-434(3) can be associated with a respective one of memory planes 472(0)-472(3), or a respective group of memory planes, and can manage operations performed on the respective plane or group of planes. For example, each of processing threads 434(0)-434(3) can provide control signals to the respective one of driver circuits 474(0)-474(3) and page buffers 476(0)-476(3) to perform those memory access operations concurrently (e.g., at least partially overlapping in time). Since the processing threads 434(0)-434(3) can perform the memory access operations, each of processing threads 434(0)-434(3) can have different current requirements at different points in time. PPM component 137 can determine the power budget needs of processing threads 434(0)-434(3) in a given power management cycle and identify one or more of processing threads 434(0)-434(3) using one of a number of power budget arbitration schemes described herein. The one or more processing threads 434(0)-434(3) can be determined based on an available power budget in the memory sub-system 110 during the power management cycles. For example, PPM component 137 can determine respective priorities of processing threads 434(0)-434(3), and allocate current to processing threads 434(0)-434(3) based on the respective priorities.

Figure 5A:
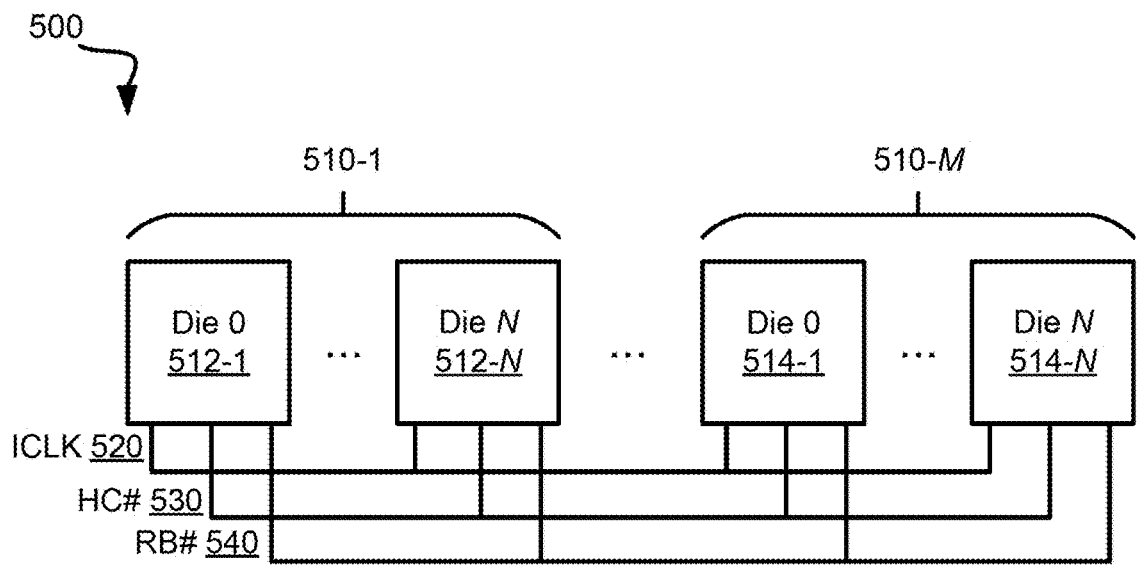
FIGS. 5A-5B are block diagrams illustrating an example system implementing dual data channel peak power management (PPM), in accordance with some embodiments of the present disclosure.
Figure 5B:
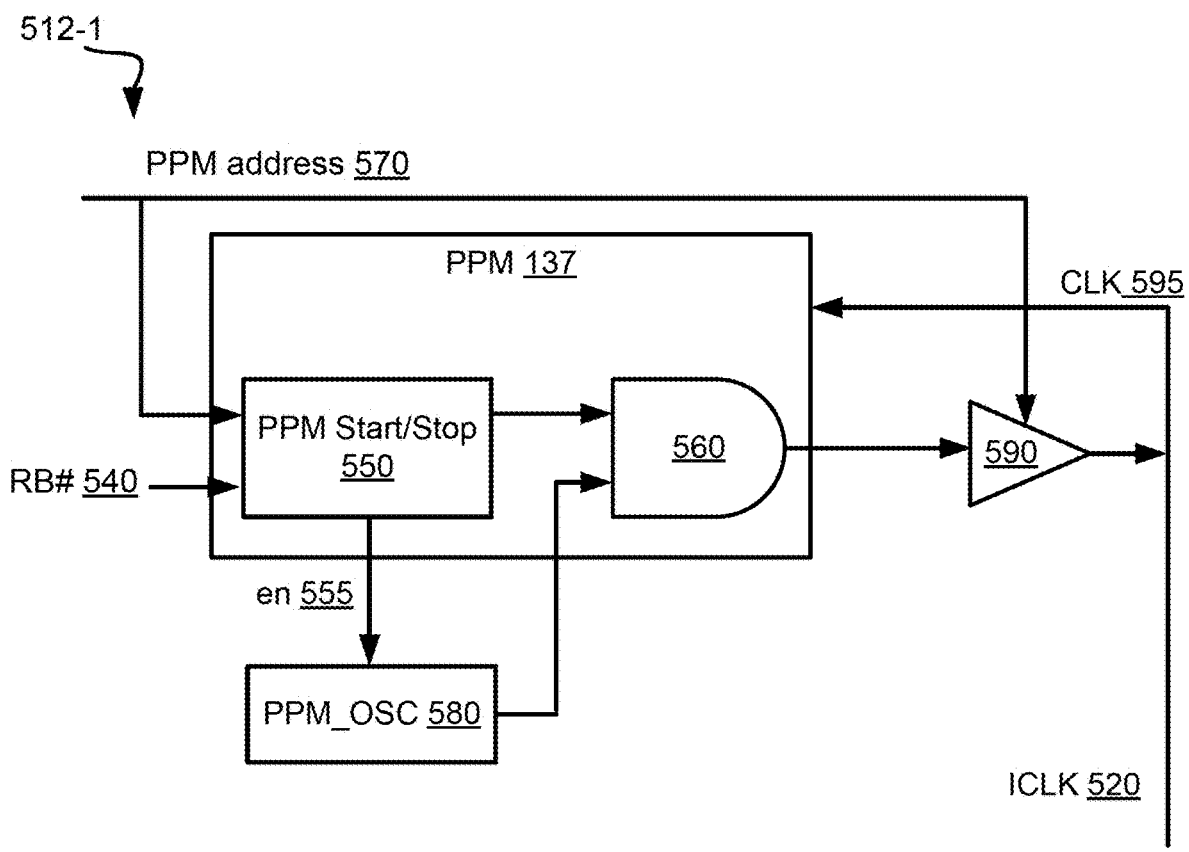

FIGS. 5A-5B are block diagrams illustrating an example system 500 implementing dual data channel PPM, in accordance with some embodiments of the present disclosure. The system 500 includes a number of die groups 510-1 through 510-M. Each die group can include a respective set of dies. For example, die group 510-1 includes Die 0 512-1 through Die N 512-N, and die group 510-M includes Die 0 514-1 through Die N 514-N. An ICLK signal can be communicated via ICLK 520, an HC# signal can be communicated via HC# 530, and an RB# signal can be communication via RB# 540. Each of the dies can include a respective PPM component 137.

While in possession of a first token, each die can communicate respective PPM data via HC# 530. Each die can further communicate respective auxiliary data via RB# 540. In some embodiments, each die can communicate auxiliary data (i.e., non-PPM data) while in possession of the first token. In some embodiments, each die can communicate auxiliary data while in possession of a second token different from the first token. For example, the auxiliary data can include data related to a data burst to be handled by the die.

To communicate the auxiliary data via RB# 540, the PPM component 137 of each die can utilize a digital filter. For example, as shown in FIG. 5B, Die 0 512-1 can include a PPM component 137 having a PPM start/stop component 550 and an AND gate 560. The PPM start/stop component 550 can receive the RB# signal ("RB#") 540 and a PPM address signal ("PPM address") 570. PPM address 570 can indicate the address of the die that is currently in possession of the token with the token ring. For example, PPM address 570 can be defined based on the address of the primary die that controls ICLK 520.

An output of the PPM start/stop component 550 can be provided as a first input to the AND gate 560. Moreover, the PPM start/stop component 550 can generate an enable signal ("en") 555, which can be received by a PPM oscillator (PPM_OSC) 580. An output of PPM_OSC 580 can be provided as a second input to the AND gate 560. An output of the AND gate 560, generated from the first input and the second input, can be provided as a first input to a buffer 590. PPM address 570 can be provided as a second input to the buffer 590. An output of the buffer 590 can be combined with ICLK 520 to generate a clock signal ("CLK") 595 used by the PPM component 137.

The PPM start/stop component 550 can implement a digital filter to delay the stopping of the clock due to the RB# 540. More specifically, the clock will stop if the amount of time that RB# 540 is continuously high satisfies a threshold condition. For example, the clock will stop if the amount of time that RB# 540 is continuously high is greater than or equal to a threshold amount of time. The threshold amount of time can be chosen based on the amount of time it takes for RB# 540 to transmit the auxiliary data.

Figure 6A:
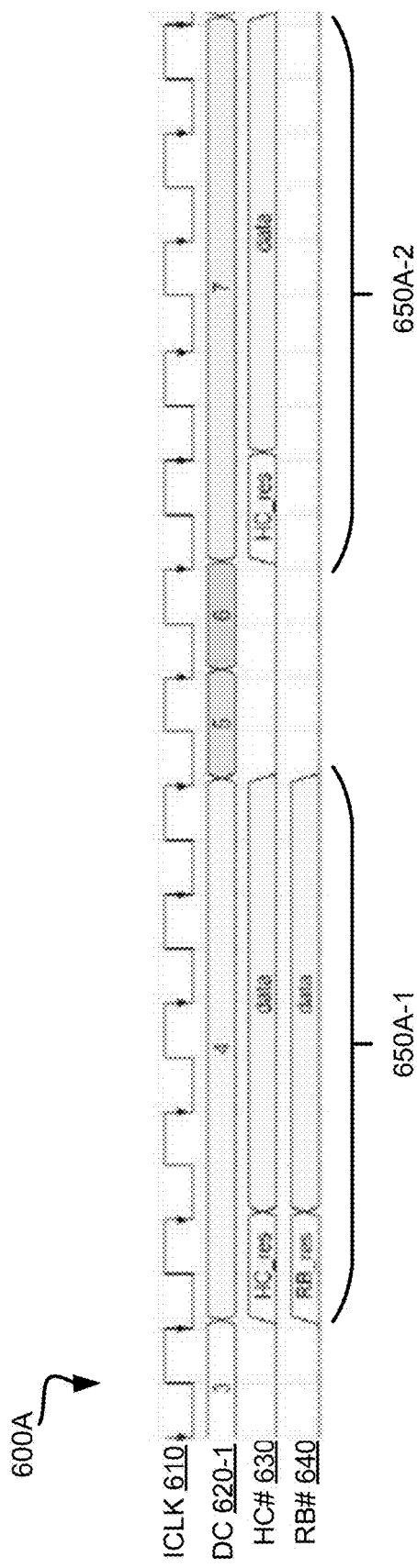
FIGS. 6A-6B are diagrams illustrating token ring communication in a memory device implementing dual data channel peak power management (PPM), in accordance with some embodiments of the present disclosure.

FIG. 6A is a diagram 600A illustrating example token ring communication in a memory device implementing dual data channel PPM, in accordance with some embodiments of the present disclosure. The diagram 600A shows ICLK 610, a die counter (DC) 620-1, HC# signal (HC#) 630 and RB# signal (RB#) 640. In this illustrative example, there is a single die counter, and thus single token, shared between HC# 630 and RB# 640. More specifically, the token enables the die in possession of the token the ability to communicate both PPM data via HC# 630 and auxiliary data via RB# 640. It is assumed that there are eight dies, Die 0 through Die 7. For example, Die 0 can be designated as the primary die that controls, e.g., ICLK 610.

In this illustrative example, during period 650A-1, Die 4 of the token ring group has determined to communicate PPM data via HC# 630 and auxiliary data via RB# 640. To do so, Die 4 initially reserves HC# 630 and RB# 640 during the first clock cycle that it is in possession of the token (after receiving the token from Die 3). Then, after the first clock cycle, Die 4 communicates the PPM data and the auxiliary data for a certain number of clock cycles. After communicating the PPM data and the auxiliary data, Die 4 passes the token to Die 5.

Moreover, during period 650A-2, Die 7 of the token ring group has determined to communicate PPM data via HC# 630 only. To do so, Die 7 initially reserves HC# 630 during the first clock cycle that is in possession of the token (after receiving the token from Die 6). Then, after the first clock cycle, Die 7 communicates the PPM data and the auxiliary data for a certain number of clock cycles. After communicating the PPM data and the auxiliary data, Die 7 passes the token to Die 0.

Figure 6B:
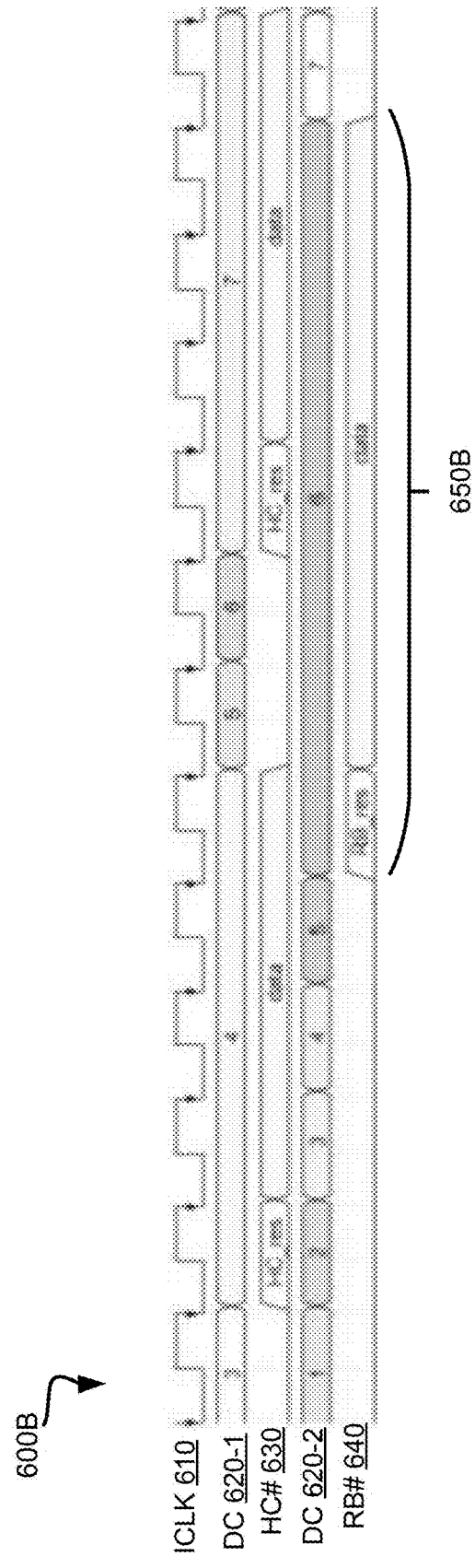

FIG. 6B is a diagram 600B illustrating example token ring communication in a memory device implementing dual data channel PPM, in accordance with some embodiments of the present disclosure. The diagram 600B shows ICLK 610, DC 620-1, HC# 630 and RB# 640. In this illustrative example, there is an additional DC 620-2. DC 620-2 is controlled by a second token different from the token described above with reference to FIG. 6A. More specifically, the second token enables the die in possession of the second token the ability to communicate auxiliary data via RB# 640, independently of PPM data communication and the other token. Similar to diagram 600A, it is assumed in diagram 600B that there are eight dies, Die 0 through Die 7. For example, Die 0 can be designated as the primary die that controls, e.g., ICLK 610.

In this illustrative example, during period 650B, Die 6 of the token ring group has determined to communicate the auxiliary data via RB# 640. To do so, Die 6 initially reserves RB# 640 during the first clock cycle that it is in possession of the second token (after receiving the second token from Die 5). Then, after the first clock cycle, Die 6 communicates the auxiliary data for a certain number of clock cycles. After communicating the auxiliary data, Die 6 passes the second token to Die 7.

Figure 7A:
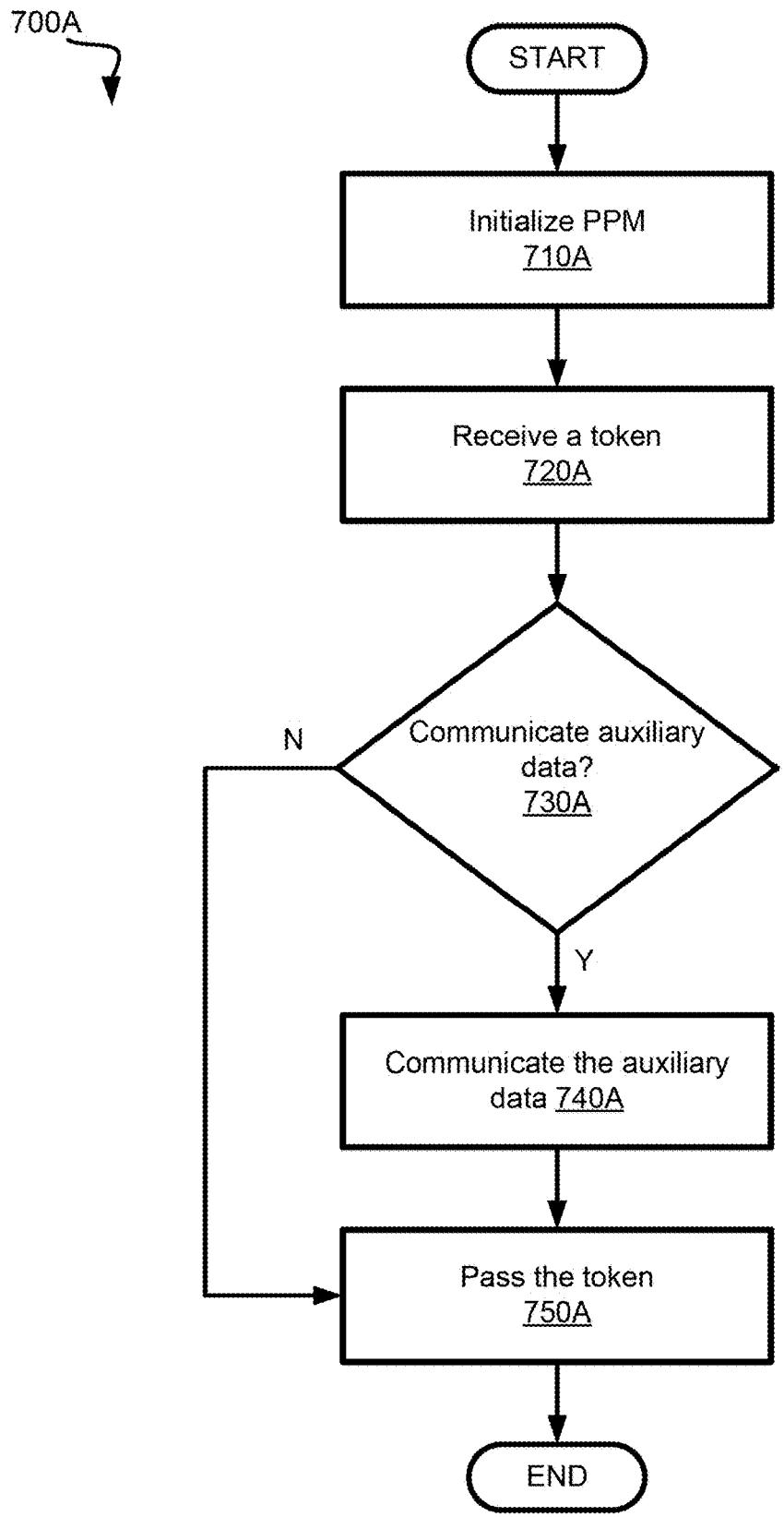
FIGS. 7A-7B are flow diagram of example methods to implement dual data channel peak power management (PPM), in accordance with some embodiments of the present disclosure.

FIG. 7A is a flow diagram of a method 700A to implement dual data channel PPM, in accordance with some embodiments of the present disclosure. The method 700A can be performed by control logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700A is performed by the local media controller 135 and/or the PPM component 137 of FIGS. 1A-1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 710A, PPM is initialized. For example, control logic can initialize a PPM within a PPM network of a memory sub-system, such as the memory sub-system 110, after power up of the memory sub-system. The PPM network can include multiple dies forming at least one token ring group. Each token ring group is an ordered group of dies.

For example, the at least one token ring group can include an HC# data channel group for communicating PPM data via the HC# data channel. The HC# data channel group can include a primary die and a number of secondary dies. For example, the first die of the HC# data channel group can be assigned to be the primary die. The primary die can be responsible for controlling the passing of a PPM token for the HC# data channel group via ICLK.

The at least one token ring group can further include an auxiliary data channel group for communicating auxiliary data via an auxiliary data channel (i.e., non-HC# data channel). In some embodiments, the auxiliary data channel group is the same as the HC# data channel group. In these embodiments, a single die counter associated with a single token can control PPM data communication and auxiliary data communication. Further details regarding these embodiments are described above with reference to FIG. 6A.

In some embodiments, the auxiliary data channel group is different from the HC# data channel group. In these embodiments, an HC# data channel group die counter associated with a first token can control PPM data communication via the HC# data channel, while an auxiliary data channel group die counter associated with a second token, different from the first token, can separately control auxiliary data communication via the auxiliary data channel. Further details regarding these embodiments are described above with reference to FIG. 6B.

Initializing PPM can include initializing a set of PPM parameters. The set of PPM parameters include a number of parameters defining the operation of PPM within the PPM network. For example, the set of PPM parameters can include current budget, the number of die of each token ring group, a size of data packets communicated by each die of each token ring group during a PPM data communication cycle and/or auxiliary data communication cycle (e.g., a token ring resolution defining a number of bits of data), a configuration of the position of each die within each token ring group (i.e., to define the order of the dies within the token ring group), etc.

At operation 720A, a token is received. For example, control logic can receive the token from another die of a token ring group. The token can enable the communication of auxiliary data via the auxiliary data channel. For example, the token ring group can be the HC# data channel group if a single die counter associated with a single token is used to control PPM data communication and auxiliary data communication. As another example, the token ring group can be a dedicated auxiliary data channel group if the HC# data channel group die counter is associated with a first token and the auxiliary data channel group is associated with a second token different from the first token.

In some embodiments, the token is received from the primary die. In some embodiments, token is received from a secondary die. If the token is received from a final die within the order defined by the at least one token ring group, then the current auxiliary data communication cycle is a new auxiliary data communication cycle relative to the previous auxiliary data communication cycle completed by the final die. If the token is received from the final die, then receiving the token can further include initializing the current auxiliary data communication cycle. For example, initializing the current auxiliary data communication cycle can include updating the auxiliary data communication cycle index for the current auxiliary data communication cycle. For example, the auxiliary data communication cycle index can be maintained by the corresponding auxiliary data communication die counter, and updating the auxiliary data communication cycle index can include increasing the corresponding auxiliary data communication die counter by one relative to the previous auxiliary data communication cycle.

At operation 730A, a determination is made. For example, control logic can determine whether any auxiliary data is eligible for communication via the auxiliary data channel during the current cycle. For example, the auxiliary data can include data related to a fast data transfer (e.g., data burst) to be handled by the die in possession of the token.

If it is determined that there is auxiliary data to be communicated at operation 730A, then the auxiliary data can be communicated at operation 740A. For example, control logic can cause the auxiliary data to be communicated to the other dies of the token ring group via the auxiliary data channel during the current cycle. More specifically, control logic can cause the auxiliary data to be communicated to the other dies via their respective PPM components. Similar to PPM data communicated via the HC# signal, the auxiliary data can be communicated as a data packet having the data packet size.

In some embodiments, the auxiliary data channel is an RB# data channel associated with an RB# signal. A digital filter can be used to perform RB# data channel toggling and prevent spurious deactivations of the PPM protocol. Further details regarding using the digital filter to perform RB# data channel toggling and prevent spurious deactivations of the PPM protocol will be described below with reference to FIG. 7B.

After communicating the auxiliary data at operation 740A, or after determining not to communicate the auxiliary data at operation 730A, the token can be passed at operation 750A. For example, control logic can cause the token to be passed to the next die of the corresponding token ring group. More specifically, control logic can cause the token to be passed to the PPM component of the next die of the corresponding token ring group. Method 700A can be repeated in response to receiving the token during the next corresponding cycle. Further details regarding operations 710A-750A are described above with reference to FIGS. 1A-6B and will be described below with reference to FIG. 7B.

Figure 7B:
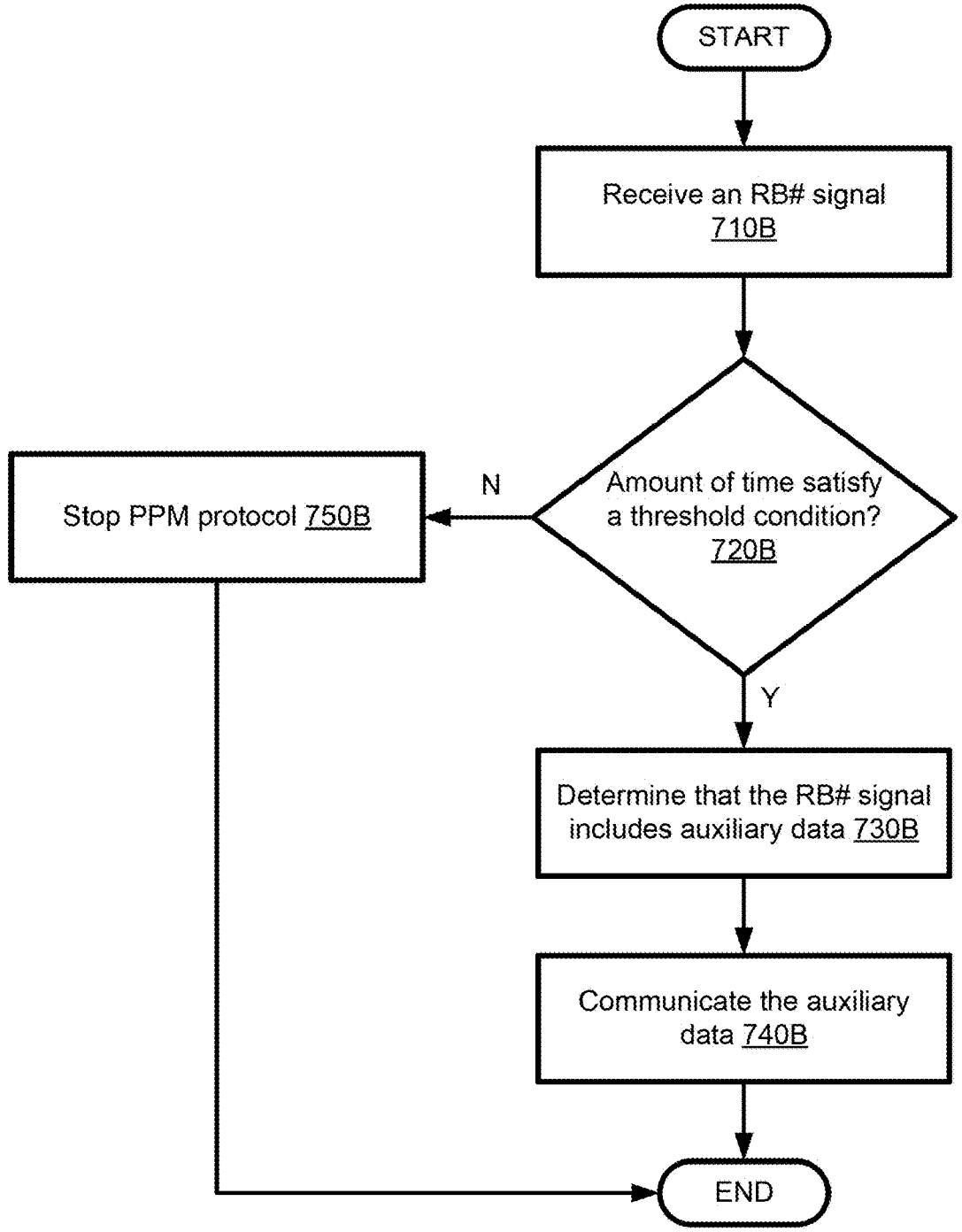

FIG. 7B is a flow diagram of a method 700B to implement dual data channel PPM, in accordance with some embodiments of the present disclosure. The method 700B can be performed by control logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700B is performed by the local media controller 135 and/or the PPM component 137 of FIGS. 1A-1B. For example, the method 700B can be performed at least in part by a digital filter (e.g., the digital filter 550 of FIG. 5B). Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 710B, an RB# signal is received. For example, control logic can receive the RB# signal via an auxiliary data channel. The auxiliary data channel can be included in a plurality of data channels configured to transmit data during PPM. For example, the plurality of data channels can further include an HC# data channel for communicating PPM data.

At operation 720B, a determination is made. For example, control logic can determine whether an amount of time that the RB# signal is continuously high ("amount of time")

satisfies a threshold condition. In some embodiments, determining whether the amount of time satisfies the threshold condition includes determining whether the amount of time is less than or equal to a threshold amount of time. The threshold amount of time can be based on the length of time of a fast data transfer (e.g., data burst). For example, the threshold amount of time can be between about 1 microsecond to about 2 microseconds.

If the amount of time that the RB# signal is continuously high satisfies the threshold condition (e.g., the amount of time that the RB# signal is high is less than or equal to the threshold amount of time), this means that the RB# data channel may currently be used to communicate auxiliary data. Thus, at operation 730B, it is determined that the RB# signal includes auxiliary data. For example, control logic can determine that the RB# signal includes auxiliary data, and prevent the RB# signal from stopping the PPM protocol. At operation 740B, the auxiliary data is communicated. For example, processing logic can cause the auxiliary data to be communicated to at least one other die in accordance with the PPM protocol. In some embodiments, the auxiliary data includes data related to a data burst. For example, the auxiliary data can include data that is indicative of a current budget for the data burst.

Otherwise, if the amount of time does not satisfy the threshold condition (e.g., the amount of time that the RB# signal is high is greater than the threshold amount of time), this means that the amount of time is longer than is needed to communicate the auxiliary data. That is, the RB# data channel is being used to communicate that all of the dies are "ready" for handling a future media access operation. Thus, the PPM protocol can be stopped at operation 750B. For example, control logic can cause the PPM protocol to stop. Further details regarding operations 710B-750B are described above with reference to FIGS. 1A-7A.

Figure 8:
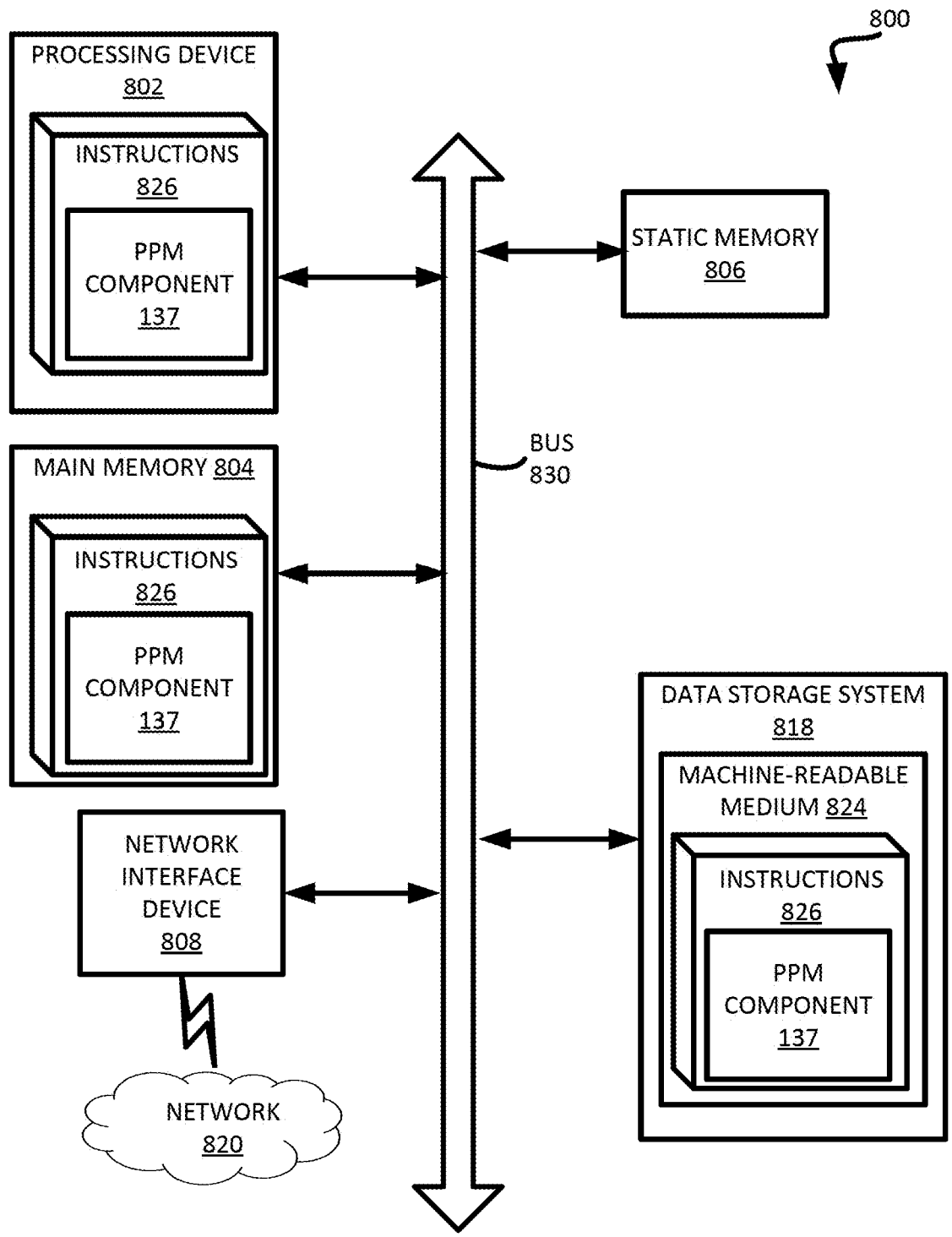
FIG. 8 is a block diagram of an example computer system in which embodiments of the present disclosure may operate.

FIG. 8 illustrates an example machine of a computer system 800 within which a set of instructions, for causing the machine to perform any one or more of the methodologies discussed herein, can be executed. In some embodiments, the computer system 800 can correspond to a host system (e.g., the host system 120 of FIG. 1A) that includes, is coupled to, or utilizes a memory sub-system (e.g., the memory sub-system 110 of FIG. 1A) or can be used to perform the operations of a controller (e.g., to execute an operating system to perform operations corresponding to the local media controller 135 and/or the PPM component 137 of FIG. 1A). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a memory cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or RDRAM, etc.), a static memory 806 (e.g., flash memory, static random access memory (SRAM), etc.), and a data storage system 818, which communicate with each other via a bus 830.

Processing device 802 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein. The computer system 800 can further include a network interface device 808 to communicate over the network 820.

The data storage system 818 can include a machine-readable storage medium 824 (also known as a computer-readable medium) on which is stored one or more sets of instructions 826 or software embodying any one or more of the methodologies or functions described herein. The instructions 826 can also reside, completely or at least partially, within the main memory 804 and/or within the processing device 802 during execution thereof by the computer system 800, the main memory 804 and the processing device 802 also constituting machine-readable storage media. The machine-readable storage medium 824, data storage system 818, and/or main memory 804 can correspond to the memory sub-system 110 of FIG. 1A.

In one embodiment, the instructions 826 include instructions to implement functionality corresponding to a local media controller and/or PPM component (e.g., the local media controller 135 and/or the PPM component 137 of FIG. 1A). While the machine-readable storage medium 824 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory device comprising:
   a plurality of memory dies, each memory die of the plurality of memory dies being operatively coupled to a plurality of data channels for communicating data in accordance with a peak power management (PPM) protocol, wherein the plurality of data channels comprises a high current (HC #) data channel for PPM data communication, and an auxiliary data channel, and wherein each memory die of the plurality of memory dies comprises:
   a memory array; and
   control logic, operatively coupled with the memory array, to perform operations comprising:
      receiving, during a current auxiliary data communication cycle, a first token to enable auxiliary data communication via the auxiliary data channel;
      in response to receiving the first token, determining whether to communicate auxiliary data via the auxiliary data channel to at least one other memory die of the plurality of memory dies; and
      in response to determining to communicate the auxiliary data via the auxiliary data channel to the at least one other memory die, causing the auxiliary data to be communicated to the at least one other memory die.

2. The memory device of claim 1, wherein the auxiliary data comprises data related to a data burst.

3. The memory device of claim 1, wherein the auxiliary data channel is a ready/busy (RB #) data channel.

4. The memory device of claim 3, wherein each memory die of the plurality of memory dies further comprises a digital filter, and wherein the operations further comprise:
   identifying, using the digital filter, that an RB #signal is high;
   determining, using the digital filter, whether an amount of time that the RB #signal is continuously high satisfies a threshold condition; and
   in response to determining that the amount of time that the RB #signal is continuously high satisfies the threshold condition, preventing the RB #signal from stopping communication of the data in accordance with the PPM protocol.

5. The memory device of claim 4, wherein determining whether the amount of time that the RB #signal is continuously high satisfies the threshold condition comprises determining whether the amount of time that the RB #signal is continuously high is less than or equal to a threshold amount of time.

6. The memory device of claim 1, wherein the first token is shared for enabling the PPM data communication and the auxiliary data communication during the current auxiliary data communication cycle.

7. The memory device of claim 1, wherein the first token is associated with an auxiliary data die counter for controlling the auxiliary data communication among the plurality of memory dies, and wherein the PPM data communication among the plurality of memory dies is controlled by a PPM data die counter associated with a second token different from the first token.

8. A memory device comprising:
   a plurality of memory dies, each memory die of the plurality of memory dies being operatively coupled to a plurality of data channels for communicating data in accordance with a peak power management (PPM) protocol, wherein the plurality of data channels comprises a high current (HC #) data channel for PPM data communication, and an auxiliary data channel for auxiliary data communication, and wherein each memory die of the plurality of memory dies comprises:
   a memory array; and
   control logic, operatively coupled with the memory array, to perform operations comprising:
      receiving, via the auxiliary data channel, a ready/busy (RB #) signal;

determining whether an amount of time that the RB #signal is continuously high satisfies a threshold condition; and in response to determining that the amount of time that the RB #signal is continuously high satisfies the threshold condition, determining that the RB #signal comprises auxiliary data for auxiliary data communication.

9. The memory device of claim 8, wherein the auxiliary data comprises data related to a data burst.

10. The memory device of claim 8, wherein the auxiliary data is indicative of a current budget for the data burst.

11. The memory device of claim 8, wherein determining whether the amount of time that the RB #signal is continuously high satisfies the threshold condition comprises determining whether the amount of time that the RB #signal is continuously high is less than or equal to a threshold amount of time.

12. The memory device of claim 8, wherein the operations further comprise, in response to determining that the amount of time that the RB #signal is continuously high does not satisfy the threshold condition, causing communication of the data in accordance with the PPM protocol to stop.

13. The memory device of claim 8, wherein the operations further comprise causing the auxiliary data to be communicated to at least one other memory die.

14. A method comprising:

receiving, by a processing device of a memory die during a current auxiliary data communication cycle, a first token to enable, in accordance with a peak power management (PPM) protocol, auxiliary data communication via an auxiliary data channel of a plurality of data channels, wherein the plurality of data channels further comprises a high current (HC #) data channel for PPM data communication;

in response to receiving the first token, determining whether to communicate auxiliary data via the auxiliary data channel to at least one other memory die; and in response to determining to communicate the auxiliary data via the auxiliary data channel to the at least one other memory die, causing, by the processing device, the auxiliary data to be communicated to the at least one other memory die.

15. The method of claim 14, wherein the auxiliary data comprises data related to a data burst.

16. The method of claim 14, wherein the auxiliary data channel is a ready/busy (RB #) data channel.

17. The method of claim 16, further comprising:

identifying, by the processing device using a digital filter, that an RB #signal is high;

determining, using the digital filter, whether an amount of time that the RB #signal is continuously high satisfies a threshold condition; and in response to determining that the amount of time that the RB #signal is continuously high satisfies the threshold condition, preventing the RB #signal from stopping communication of the data in accordance with the PPM protocol.

18. The method of claim 17, wherein determining whether the amount of time that the RB #signal is continuously high satisfies the threshold condition comprises determining whether the amount of time that the RB #signal is continuously high is less than or equal to a threshold amount of time.

19. The method of claim 14, wherein the first token is shared for enabling the PPM data communication and the auxiliary data communication during the current auxiliary data communication cycle.

20. The method of claim 14, wherein the first token is associated with an auxiliary data die counter for controlling the auxiliary data communication among a plurality of memory dies, and wherein the PPM data communication among the plurality of memory dies is controlled by a PPM data die counter associated with a second token different from the first token.

* * * * *